United States Patent
Sambamurthy et al.

(10) Patent No.: US 6,393,489 B1
(45) Date of Patent: *May 21, 2002

(54) MEDIA ACCESS CONTROL ARCHITECTURES AND NETWORK MANAGEMENT SYSTEMS

(75) Inventors: Namakkal S. Sambamurthy; Devendra K. Tripathi; Alak K. Deb; Linh Tien Truong, all of San Jose; Praveen D. Kumar, Fremont, all of CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/594,745

(22) Filed: Jun. 13, 2000

Related U.S. Application Data

(63) Continuation of application No. 08/845,562, filed on Apr. 24, 1997, now Pat. No. 6,108,713.
(60) Provisional application No. 60/037,588, filed on Feb. 11, 1997.

(51) Int. Cl.[7] .............................................. G06F 15/16
(52) U.S. Cl. .................................... 709/250; 370/463
(58) Field of Search ................................ 709/250, 223, 709/224, 234, 229, 230, 232; 370/463, 462, 475

(56) References Cited

U.S. PATENT DOCUMENTS

| | | | |
|---|---|---|---|
| 4,590,467 A | 5/1986 | Lare ........................ | 370/462 X |
| 5,058,114 A | 10/1991 | Kuboki et al. ................ | 371/19 |
| 5,175,732 A | 12/1992 | Hendel et al. .............. | 370/463 |
| 5,201,056 A | 4/1993 | Daniel et al. ................. | 712/41 |

(List continued on next page.)

FOREIGN PATENT DOCUMENTS

| | | |
|---|---|---|
| EP | 0 459 758 A2 | 12/1991 |
| EP | 0 725 351 A2 | 8/1996 |

OTHER PUBLICATIONS

Unknown, "Reprint of Selected Presentations made to IEEE 802.3z," Vancouver, BC, Nov. 1, 1996 pp. 1–170.
Unknown, "84C00A 4–Port Fast Ethernet Controller," SEEQ Technology, Inc., Nov. 6, 1995.
Unknown, "Local Area Networks Databook," National Semiconductor Corp., Santa Clara, CA, 1993 Edition, pp. 1–3, 1–82, 1–149, 1–266, 1–410, 1–506, 1–600, 3–3, 3–74, 3–125.
Unknown, "Intel Microcommunications," Intel Corp., Mt. Prospect, IL, 1992, pp. 1–1, 1–38, 1–64, 1–97, 1–138, 1–210, 1–360, 1–44.

(List continued on next page.)

*Primary Examiner*—Patrice Winder
(74) *Attorney, Agent, or Firm*—Beyer, Weaver & Thomas, LLP

(57) ABSTRACT

Disclosed is a media access controller for transferring data along a computer network. The media access controller includes a transmit media access controller that is configured to process out-going packet data received from an upper layer for transmission to a lower layer. A receive media access controller that is configured to process in-coming packet data received from the lower layer for transmission to the upper layer. A transmit multi-packet queue FIFO for receiving the out-going packet data from the upper layer before being passed to the transmit media access controller. A receive multi-packet queue FIFO for receiving the in-coming packet data that is received by the receive media access controller. The media access controller further including a media access controller manager interfacing with the transmit and receive media access controllers. The media access controller manager being responsible for managing the flow of packet data through the transmit and receive multi-packet queue FIFOs.

15 Claims, 26 Drawing Sheets

U.S. PATENT DOCUMENTS

| | | | |
|---|---|---|---|
| 5,225,975 A | 7/1993 | Gates et al. | 364/147 |
| 5,245,606 A | 9/1993 | DeSouza | 370/85.13 |
| 5,245,617 A | 9/1993 | DeSouza et al. | 371/37.1 |
| 5,245,704 A | 9/1993 | Weber et al. | 709/215 |
| 5,297,277 A | 3/1994 | Dein et al. | 395/575 |
| 5,305,321 A | 4/1994 | Crayford | 370/94.1 |
| 5,311,114 A | 5/1994 | Sambamurthy et al. | 370/31 |
| 5,351,243 A | 9/1994 | Kalkunte et al. | 370/475 |
| 5,365,513 A | 11/1994 | Copley et al. | 370/17 |
| 5,379,289 A | 1/1995 | DeSouza et al. | 370/85.13 |
| 5,404,544 A | 4/1995 | Crayford | 713/310 |
| 5,412,782 A | 5/1995 | Hausman et al. | 709/250 |
| 5,434,976 A | 7/1995 | Tan et al. | 709/234 |
| 5,436,902 A | 7/1995 | McNamara et al. | 370/85.3 |
| 5,446,914 A | 8/1995 | Paul et al. | 709/235 |
| 5,457,681 A | 10/1995 | Gaddis et al. | 370/56 |
| 5,491,531 A | 2/1996 | Adams et al. | 375/354 |
| 5,504,738 A | 4/1996 | Sambamurthy et al. | 370/31 |
| 5,594,702 A | 1/1997 | Wakeman et al. | 395/507 X |
| 5,640,605 A | 6/1997 | Johnson et al. | 395/881 |
| 5,717,855 A | 2/1998 | Norman et al. | 709/250 |
| 5,790,786 A | 8/1998 | Wakeman et al. | 709/249 |
| 5,822,618 A | 10/1998 | Ecclesine | 710/57 |
| 6,108,713 A * | 8/2000 | Sambamurthy et al. | 709/250 |

OTHER PUBLICATIONS

Patrick Van Eijk, "Gigabit Ethernet: Technology, Systems, and Network Applications," pp. 85–90, Apr. 1997, Electric Design, vol. 45, No. 7.

Lisa S. Brown, "100VG–AnyLAN 15–Port Hub Design," Aug. 1995' Hewlett–Packard Journal.

The Institute of Electrical and Electronics Engineers, Inc., "IEEE Standards for Local and Metropolitan Area Networks: Supplement to Carrier Sense Multiple Access with Collison Detection (CSMA/CD) Access Method and Physical Layer Specifications—Media Access Control (MAC) Parameters, Physical Layer, Medium Attachment Units, and Repeater for 100 Mb/s Operation, Type 100BASE–T (Clauses 21–30)," 1995, LAN MAN Standards Committee of the IEEE Computer Society.

* cited by examiner

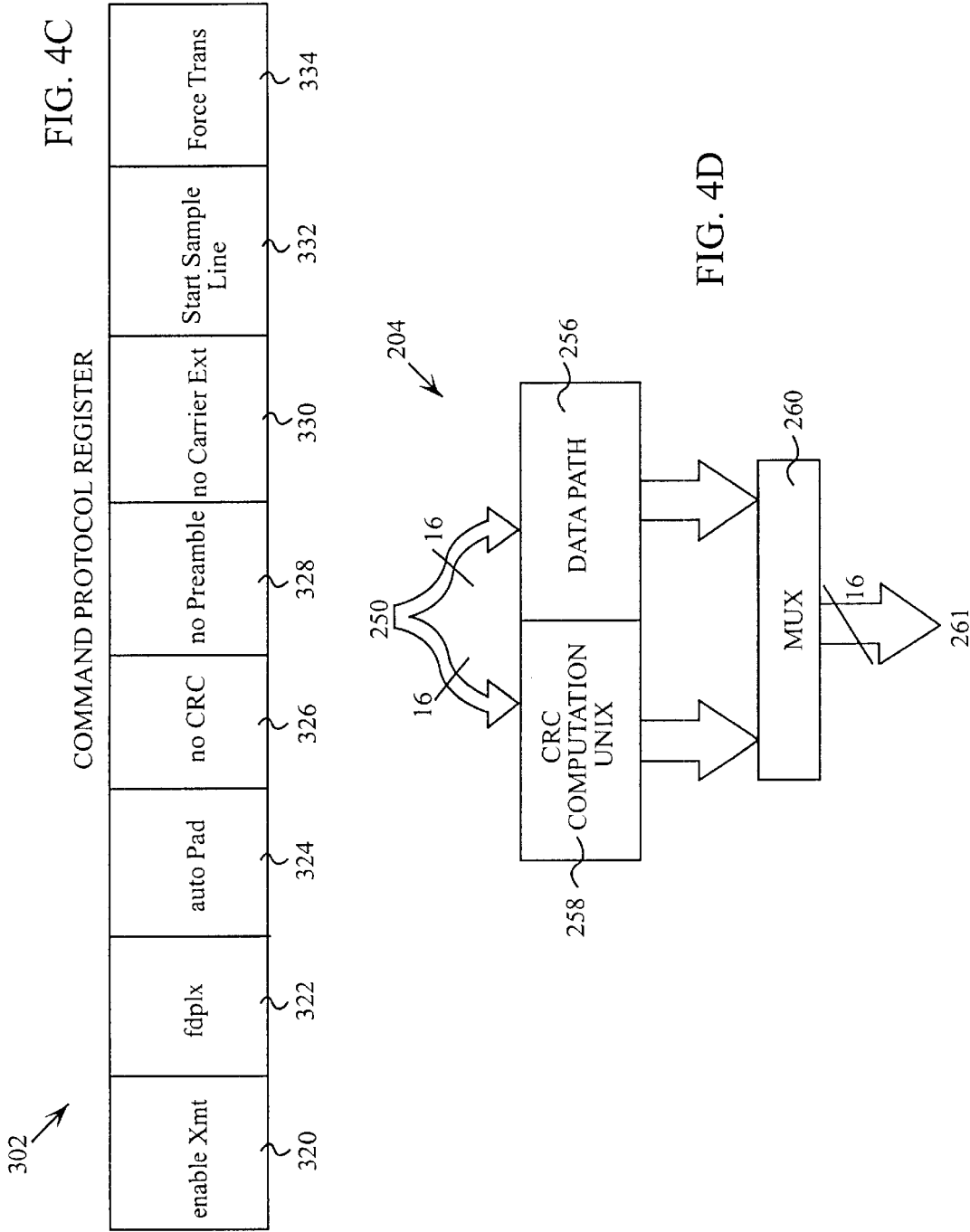

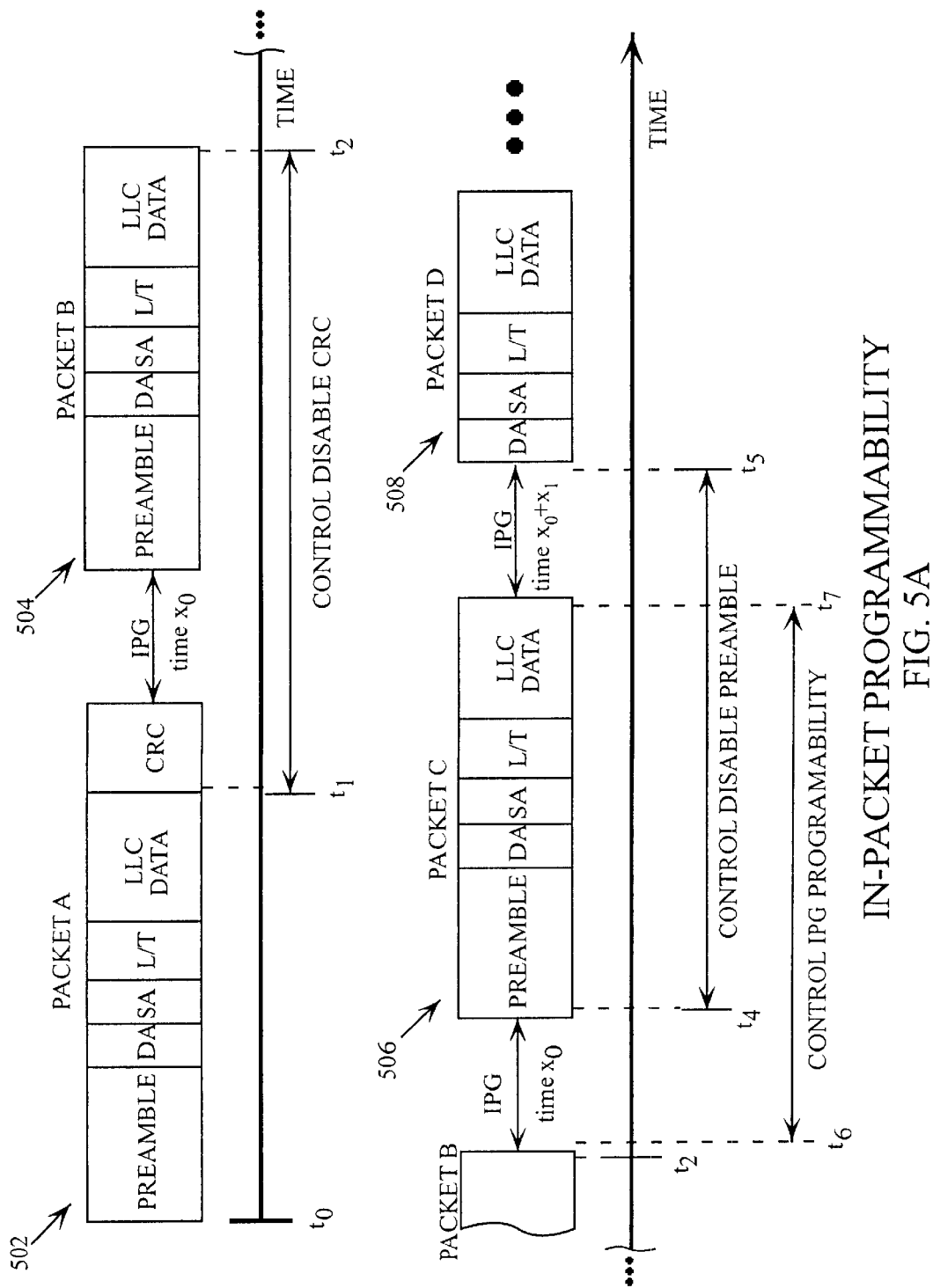

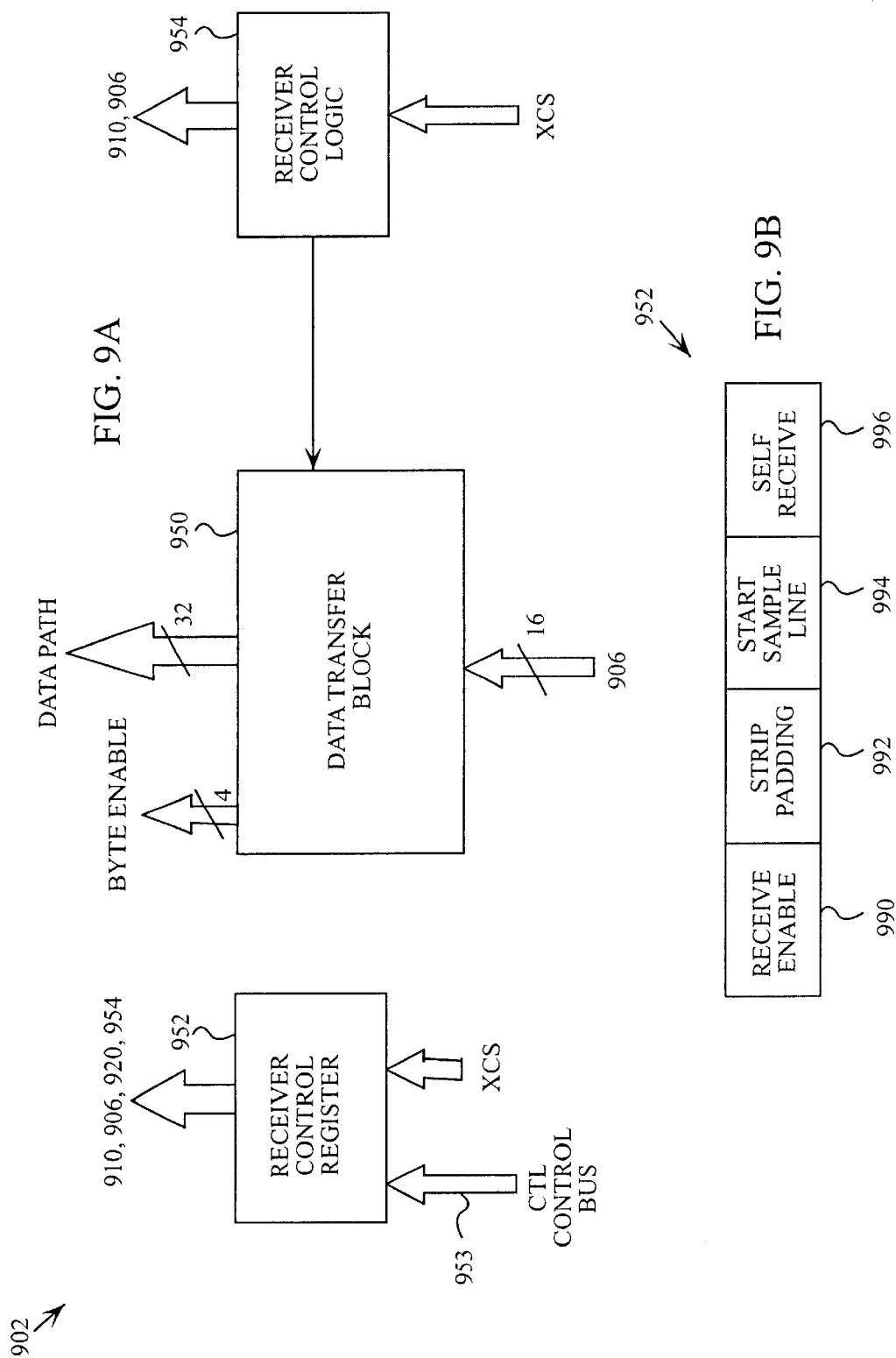

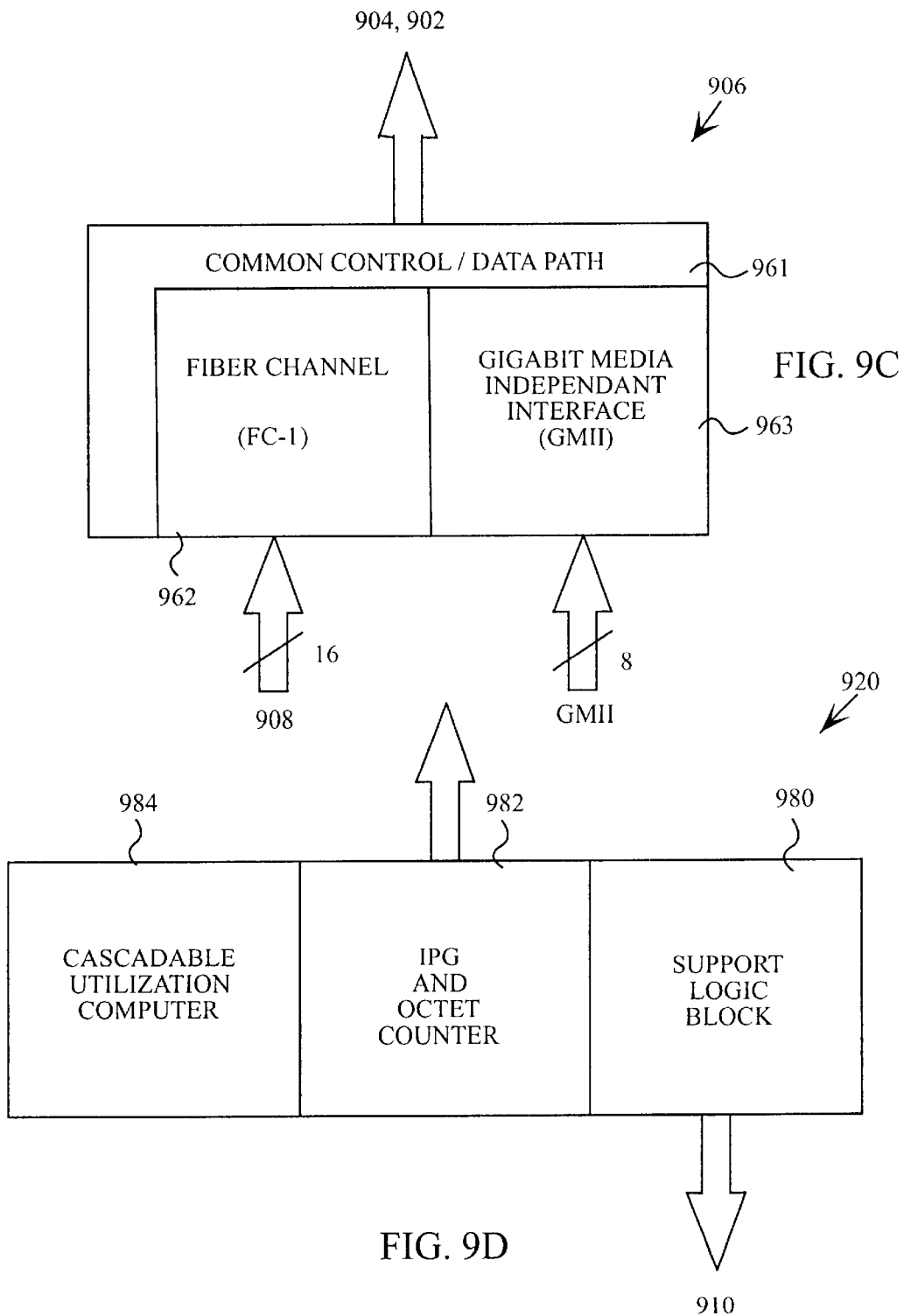

MEDIA ACCESS CONTROL ARCHITECTURES AND NETWORK MANAGEMENT SYSTEMS

CROSS REFERENCE TO RELATED APPLICATIONS

This application claims the benefit of U.S. Provisional Patent Application having Ser. No. 60/037,588, filed on Feb. 11, 1997, entitled "Methods and Apparatuses for Performing Media Access Control And Network Management." This application is hereby incorporated by reference.

This is a Continuation application of prior application Ser. No. 08/845,562 filed on Apr. 24, 1997, now U.S. Pat. No. 6,108,713, which claims benefit of 60/037,588 filed on Feb. 11, 1997 which designated the United States, the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights.

BACKGROUND OF THE INVENTION

1. Field of the Invention

The present invention relates generally to integrated circuit devices used for processing data through communication networks, and more particularly, to methods and apparatuses for processing and managing the flow of data in high speed networks.

2. Description of the Related Art

The Ethernet local area network (LAN) is one of the most popular and widely used computer networks in the world. Since the Ethernet's beginnings in the early 1970's, computer networking companies and engineering professionals have continually worked to improve Ethernet product versatility, reliability and transmission speeds. To ensure that new Ethernet products were compatible and reliable, the Institute of Electrical and Electronic Engineers (IEEE) formed a working group to define and promote industry LAN standards. Today, the IEEE has various Ethernet working groups that are responsible for standardizing the development of new Ethernet protocols and products under an internationally well known LAN standard called the "IEEE 802.3 standard."

Currently, there are a wide variety of standard compliant Ethernet products used for receiving, processing and transmitting data over Ethernet networks. By way of example, these networking products are typically integrated into networked computers, network interface cards (NICs), routers, switching hubs, bridges and repeaters. Until recently, common data transmission speeds over Ethernet networks were 10 mega bits per second (Mbps). However, to meet the demand for faster data transmission speeds, the IEEE 802.3 standards committee officially introduced the "IEEE 802.3u standard" in May of 1995. This standard is also referred to as the "100 BASE T Fast Ethernet" standard because of its ability to perform data transmissions up to about 100 Mbps.

FIG. 1A is a diagrammatic representation of an open systems interconnection (OSI) layered model 10 developed by the International Organization for Standards (ISO) for describing the exchange of information between layers. The OSI layered model 10 is particularly useful for separating the technological functions of each layer, and thereby facilitating the modification or update of a given layer without detrimentally impacting on the functions of neighboring layers. At a lower most layer, the OSI model 10 has a physical layer 12 that is responsible for encoding and decoding data into signals that are transmitted across a particular medium. As is well known in the art, physical layer 12 is also known as the "PHY layer."

Above the physical layer 12, a data link layer 14 is defined for providing reliable transmission of data over a network while performing appropriate interfacing with physical layer 12 and a network layer 16. As shown, data link layer 14 generally includes a logical link layer (LLC) 14a and a media access control layer (MAC) 14b. LLC layer 14a is generally a software function that is responsible for attaching control information to the data being transmitted from network layer 16 to MAC layer 14b. On the other hand, MAC layer 14b is responsible for scheduling, transmitting and receiving data over a link. Thus, MAC layer 14b is primarily responsible for controlling the flow of data over a network, ensuring that transmission errors are detected, and ensuring that transmissions are appropriately synchronized. As is well known in the art, MAC layer 14b generally schedules and controls the access of data to physical layer 12 using a well known carrier sense multiple access with collision detection (CSMA/CD) algorithm.

Network layer 16 is responsible for routing data between nodes in a network, and for initiating, maintaining and terminating a communication link between users connected to the nodes. Transport layer 18 is responsible for performing data transfers within a particular level of service quality. By way of example, a typical software protocol used for performing transport layer 18 functions may be TCP/IP, Novell IPX and NetBeui. Session layer 20 is generally concerned with controlling when users are able to transmit and receive data depending on whether the user's is capable of full-duplex or half-duplex transmission. Presentation layer 22 is responsible for translating, converting, compressing and decompressing data being transmitted across a medium. As an example, presentation layer 22 functions are typically performed by computer operating systems like Unix, DOS, Microsoft Windows 95, Windows NT and Macintosh OS. Finally, Application layer 24 provides users with suitable interfaces for accessing and connecting to a network.

FIG. 1B is a diagrammatic representation of typical Ethernet packets used for transferring data across a network. A packet generally includes a preamble 30 which is typically 8 bytes long. The last byte (or octet) in the preamble is a start frame delimiter (not shown). After the start frame delimiter octet, a destination address (DA) 32 which is typically 6 bytes is used to identify the node that is to receive the Ethernet packet. Following DA 32, is a source address (SA) 34 which is typically 6 bytes long, SA 34 is used to identify the transmitting node directly on the transmitted packet. After the SA 34, a length/type field (L/T) 36 (typically 2 bytes) is generally used to indicate the length and type of the data field that follows. As is well known in the art, if a length is provided, the packet is classified as an 802.3 packet, and if the type field is provided, the packet is classified as an Ethernet packet.

The following data field is identified as LLC data 38 since the data field also includes information that may have been encoded by the LLC layer 14a. A pad 40 is also shown following LLC data 38. As is well known in the art, if a given Ethernet packet is less than 64 bytes, most media access controllers add a padding of 1's and 0's following LLC data 38 in order to increase the Ethernet packet size to at least 64 bytes. Once pad 40 is added, if necessary, a 4 byte cyclic redundancy check (CRC) field is appended to the end of a packet in order to check for corrupted packets at a receiving end. As used herein, a "frame" should be understood to be a sub-portion of data contained within a packet.

As described above, because MAC layer 14b is responsible for controlling the flow of data over a network, MAC layer 14b is generally responsible for encapsulating received LLC data 38 with an appropriate preamble 30, DA 32, SA 34, DFL 36, Pad 40 and CRC 42. Further, an inter-packet gap (IPG) is shown identifying a time span between transmitted Ethernet packets. Conventionally, the IPG is a fixed value that is defined by the 802.3 standard, and imposed by a suitable MAC layer 14b. For more information on Ethernet network communication technology, reference may be made to issued U.S. Patents entitled Apparatus and Method for Full-Duplex Ethernet Communications having U.S. Pat. Nos. 5,311,114 and 5,504,738. These patents are hereby incorporated by reference.

FIG. 1C is a system architecture representation of a conventional Ethernet media access controller (MAC) 50. As shown, MAC 50 includes a transmit (Tx) MAC controller 54 for processing data received from an upper LLC layer, and a receive (Rx) MAC controller 56 for processing Ethernet packets received from a physical medium 84. From the transmission side, data is typically received from the upper LLC layer through a system bus 78. As shown, all data that is passed to MAC 50 is sent to a bus interface controller 74 through a path 52. In addition, control and command signals are also generally passed in a serial manner to MAC 50 through path 52. Once data is passed into bus interface controller 74, the data is passed into a Tx FIFO 62 which acts as a buffer for holding data received from the upper LLC layer.

In general, both Tx FIFO 62 and a Rx FIFO 64 have associated FIFO control blocks 66 and 68, for passing control information to MAC controller 54, and for triggering the transfer of data stored Tx FIFO 62 and Rx FIFO 68. Therefore, in conventional MAC architectures, once a selected processing control is passed to Tx MAC controller 54 or Rx MAC controller 56, that particular control information will remain as the "set control" for a predetermined number of Ethernet packets. Consequently, the processing operations performed by Tx MAC controller 54 and Rx MAC controller 56 cannot be modified during the transmission of each particular frame (i.e., they may only be modified between transmissions).

Further shown are command status registers 72 and statistics counters 70 that are conventionally used to account for and keep track of processing being performed in Tx MAC controller 54 and Rx MAC controller 56. In this conventional MAC design, path 52 is generally used for passing both data and control signals. However, when information stored in the command status registers 72 and statistics counters 70 is accessed, any data or control signal currently being passed to Tx MAC controller 54 will be halted (which necessarily slows down the network). Accordingly, management tasks that require access to the command status registers 72 and statistics counters 70 will also complete for use of path 52.

Although the conventional MAC architecture 50 has worked well, further improvements to handle increased data throughputs, handle critical flow control issues, and handle management and network diagnostics issues are always desirable. These features are especially desirable as network speeds continue to increase. As an example, in current technology Ethernet networks, flow control tasks are generally not even attempted, and most data transfers are performed as end-to-end dumps over a selected link. That is, once the transmitter parameters are set to perform requested processing (i.e., the packet construction parameters are set), the transmitter will continue dumping packets through the network until the user wants to update the transmitted packet construction parameters. Thus, if an update is requested, the changes to the processing must be passed from the LLC layer down to the MAC layer through the same processing path.

Unfortunately, when both control and data are passed through one processing path, both data and control must compete for bandwidth and only one is processed at one time. Consequently, once a packet transmission or receiving function is initiated, the processing parameters may not be changed. A further disadvantage with prior art Ethernet MAC layer processing is that once an erroneous packet is transmitted, there is generally no way of preventing or aborting its transmission. Therefore, the receive side will necessarily be required to deal with processing more error prone packets.

Furthermore, prior art Ethernet MAC receiving layers are currently unable to efficiently communicate back to the transmitting station in situations where the receiver side of a MAC layer is unable to handle a large queue of packets. As is well known in the art, prior attempts at solving this problem has been to increase the buffer size within the MAC layer. Although increasing buffer sizes may have slowed the problem for current technology 10 Mbps and 100 Mbps Ethernet systems, once transmissions are increased to the gigabit and greater level, increasing buffer sizes will no longer be a reasonable solution in view of the increased data throughput requirements.

It is further pointed out that prior art Ethernet systems are currently unable to provide network managers with an appropriate level of network performance diagnostics abilities. By way of example, when network diagnostics and performance characteristics are performed, network managers typically implement expensive diagnostic and network sniffing equipment that is oftentimes prohibitively expensive when analyzing average size networks. As a result, network managers typically choose to upgrade entire Ethernet systems before attempts are made to trouble shoot a networks performance faults and flow control limitations.

In view of the foregoing, there is a need for methods and apparatuses for media access control (MAC) layer processing that will allow for in-line packet-by packet processing of data information and control information to modify a packet's characteristics while it is being processed for transmission or reception. In addition, there is a need for methods and apparatuses for a MAC layer processing that allows users to manage the flow of packet data being transmitted and received through a network and accurately perform sophisticated diagnostic testing.

SUMMARY OF THE INVENTION

Broadly speaking, the present invention fills these needs by providing methods and apparatuses for a high speed media access controller used to process packet data and control information in an in-line packet-by packet manner. It should be appreciated that the present invention can be implemented in numerous ways, including as a process, an apparatus, a system, a device, a method, or a computer readable medium. Several inventive embodiments of the present invention are described below.

In one embodiment, a media access controller is disclosed. The media access controller includes a transmit media access controller that is configured to process outgoing packet data received from an upper layer for transmission to a physical layer. A receive media access controller that is configured to process in-coming packet data received from the physical layer for transmission to the upper layer. A transmit multi-packet queue FIFO for receiving the out-going packet data from the upper layer before being passed to the transmit media access controller. A receive multi-packet queue FIFO for receiving the in-coming packet data that is received by the receive media access controller. The media access controller further including a media access controller manager interfacing with the transmit and receive media access controllers. The media access controller manager being responsible for managing the flow of packet data through the transmit and receive multi-packet queue FIFOs.

In another embodiment, a network interface system for communicating across a network is disclosed. The network interface system includes a media access controller for processing transmit data received an upper layer and transmitting the processed transmit data to a lower layer, and processing receive data received from the lower layer and transmitting the processed receive data to the upper layer. The media access controller being configured to monitor the flow of data between the upper and lower layers. The network interface further including a data bus for communicating data and data control information between the upper layer and the media access controller. A management control bus for communicating management control information between the upper layer and the media access controller, the management control bus being independent of the data bus.

In yet another embodiment, a method for making a media access controller for processing data transmit requests, data receive requests and monitoring data flow through the media access controller is disclosed. The media access controller being configured to communicate with an upper layer and a lower layer. The method includes integrating a first bus for transferring data into and out of the media access controller. Integrating a second bus for communicating management control requests to the media access controller while the transferring of data is in progress. The second bus being coupled to a parallel events processor containing a microprocessor for filtering selected data that is being transferred through the first bus.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 4C shows a plurality of suitable flags used for enabling and disabling processing functions carried out within a SUPERMAC Tx controller in accordance with one embodiment of the present invention.

FIG. 4D is a more detailed representation of a transmit CRC block in accordance with one embodiment of the present invention.

FIG. 5A is a diagrammatic representation of four packets being transmitted through a flow based MAC in accordance with one embodiment of the present invention.

FIG. 9A is a more detailed block diagram of a receiver LLC interface of FIG. 9 in accordance with one embodiment of the present invention.

FIG. 9B illustrates exemplary flags contained within a receiver control register in accordance with one embodiment of the present invention.

FIG. 9C shows a more detailed block diagram of the structure contained within a receiver FC/GMII of FIG. 9 in accordance with one embodiment of the present invention.

FIG. 9D is a block diagram that illustrates in greater detail the functional blocks contained within a receive utilities block of FIG. 9 in accordance with one embodiment of the present invention.

DETAILED DESCRIPTION OF THE PREFERRED EMBODIMENTS

An invention is described for a high speed Ethernet media access control layer integrated circuit core and method for processing packet data in an in-line packet-by-packet manner that allows simultaneous processing of data information and associated control signals. Also disclosed is a media access controller that is especially suited for performing packet-by-packet flow management and accurately performing sophisticated network diagnostic testing. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

Figure 1A:
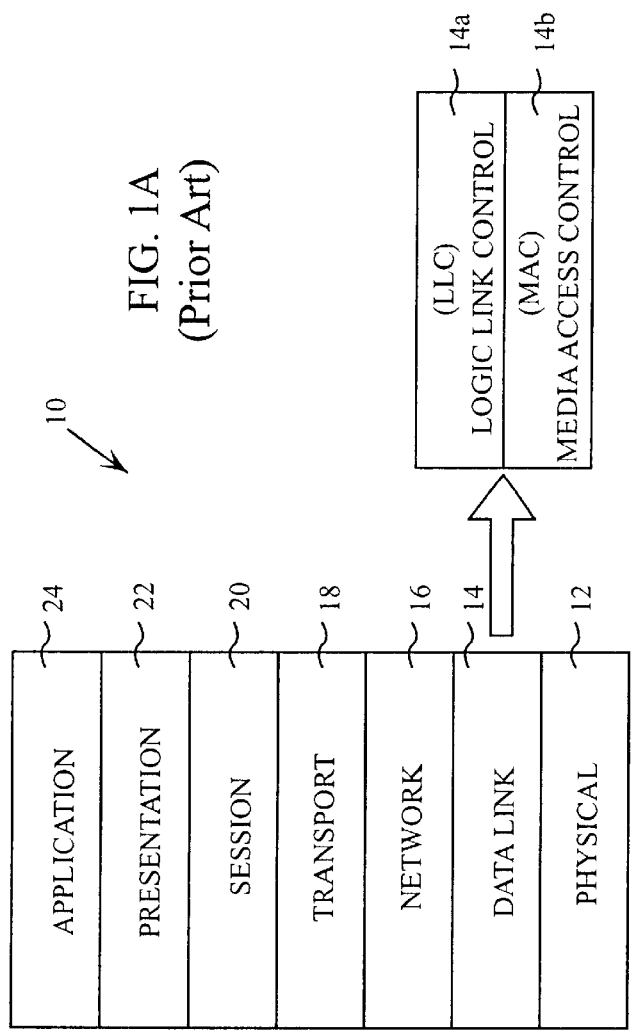
FIG. 1A is a diagrammatic representation of an open systems interconnection (OSI) layered model developed by the International Organization for Standards (ISO) for describing the exchange of information between layers.
Figure 1B:
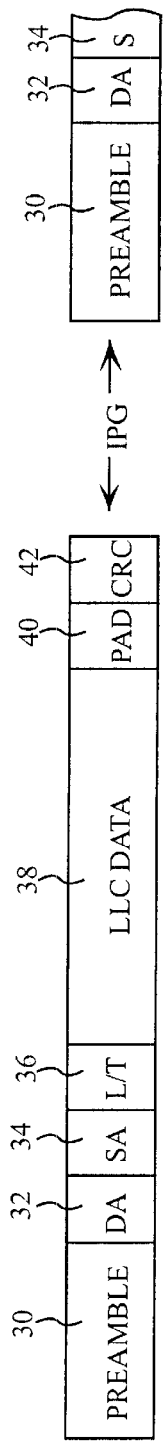
FIG. 1B is a diagrammatic representation of an exemplary Ethernet packet that is conventionally used for transferring data across a network.
Figure 1C:
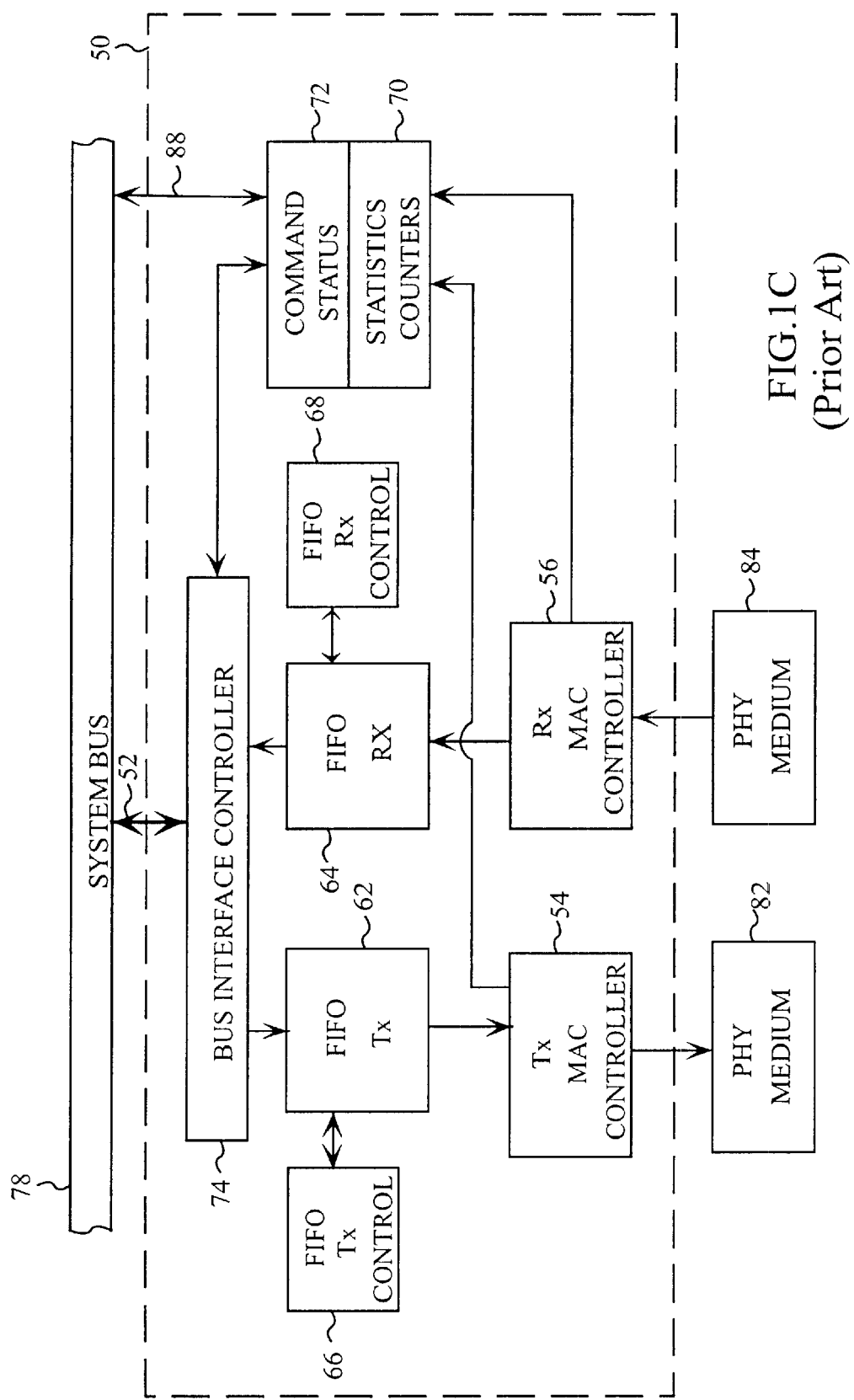
FIG. 1C is a system architecture representation of a conventional Ethernet media access controller (MAC).
Figure 2:
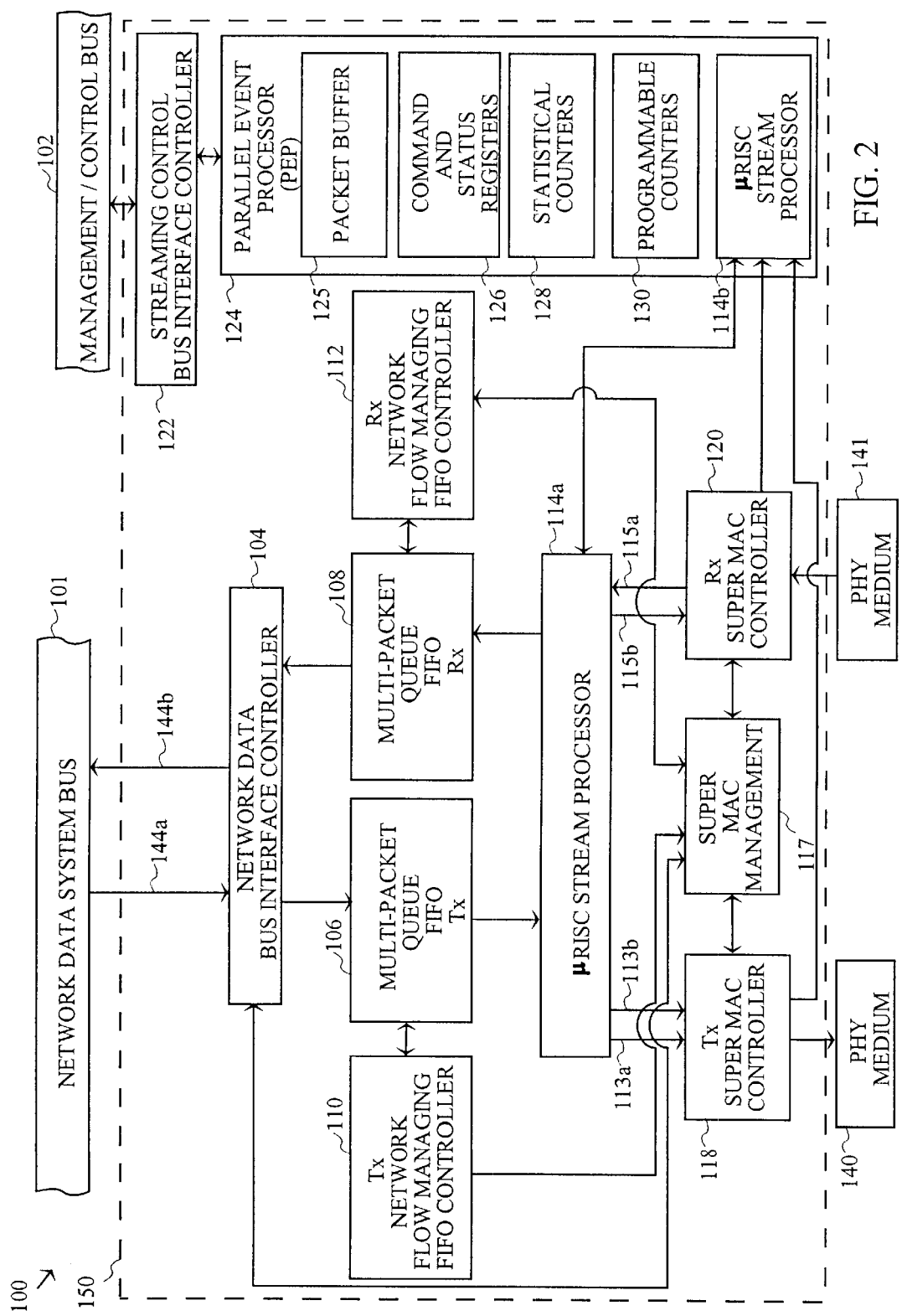
FIG. 2 is an architectural diagram of a flow based media access controller (MAC) in accordance with one embodiment of the present invention.

FIG. 2 is an architectural diagram of a flow based media access controller (MAC) 150 for high speed transmissions in accordance with one embodiment of the present invention. In a preferred embodiment, gigabit speed Ethernet transmissions are contemplated. However, it should be appreciated that the architecture is equally applicable to other transmission protocols and both higher and lower speed transmissions. In one embodiment, flow based MAC 150 is a parallel data and control processing architecture. As illustrated in FIG. 2, the flow based MAC 150 interfaces with a network data system bus 101 where both data and control information are processed, and a management/control bus 102 where both control and management data are passed. Advantageously, as data is passed through network data system bus 101 and processed through the various processing blocks of flow based MAC 150, control information may also be simultaneously passed through network data system bus 101. It is important to realize that this type of parallel processing provides the ability to change the processing parameters within flow based MAC 150 at any given time (i.e., even while packet data is being processed).

By way of example, suppose data is being received from an upper LLC layer, and is being processed through various processing blocks where a preamble field and a CRC field are appended to form a packet. Due to the parallel processing nature of flow based MAC 150, control information may be simultaneously passed through network data system bus 101 to modify portions of the packet that has not yet been processed. Accordingly, the parallel processing nature of flow based MAC 150 is capable of passing appropriate control information to alter specific processing parameters even while data is currently being processed.

Referring first to the transmission side, when data is initially received from the upper LLC layer through network data system bus 101, data is transferred to a network data bus interface controller (BIC) 104. In this embodiment, network data BIC 104 may be any suitable interface controller such as a slave interface and a direct memory access (DMA) on-board interface. As shown, a first data/control path 144*a* and a second data/control path 144*b* may be used to interconnect network data bus interface 101 to network data BIC 104 when high performance switching tasks are required of flow based MAC 150. By way of example, first data/control path 144*a* may be used for performing transfers from the upper LLC layer to flow based MAC 150, and second data/control path 144*b* may be used for performing transfers from flow based MAC 150 to the upper LLC layer. Of course, it is also contemplated that a single bi-directional data/control path may be used to perform the aforementioned control and data transfers.

Once data is transmitted from network data system bus 101 to network data BIC 104, data may then be appropriately transferred to a multi-packet queue FIFO Tx 106. Generally, FIFO Tx 106 acts as a buffer (e.g., RAM memory) for holding data that is being transmitted from the upper LLC layer through network data system bus 101. In this embodiment, FIFO Tx 106 is preferably capable of storing up to ten or more packets of data. This is a significant improvement over conventional single packet FIFO structures that would typically be unable to accommodate greater storage requirements associated with increased throughputs produced by gigabit speed (e.g.,+1,000 Mbps) systems in accordance with one embodiment of the present invention.

Once a suitable number of packets are buffered in FIFO Tx 106, a network flow managing FIFO Tx controller 110 is implemented to manage the high speed flow of packets from FIFO Tx 106 into a micro RISC stream processor 114*a*. At a higher level, network flow managing FIFO Tx controller 110 may be responsible for prioritizing the different types of data being transferred across a network, such as audio, video, graphics, etc. In this manner, flow based MAC 150 is capable of having multiple simultaneous streams of data flowing through FIFO Tx 106 at one time. In one feature, when packets are being read out from FIFO Tx 106, any one particular packet may be skipped without reading the entire packet. In another feature, a packet may be re-transmitted from FIFO Tx 106 by holding a given packet for a programmable time. In still another feature, a packet being written into FIFO Tx 106 may be flushed directly out of FIFO Tx 106 before being transmitted to micro-RISC stream processor 114*a*.

In a further embodiment, network flow managing FIFO Tx controller 110 is suited to number each of the frames received in FIFO Tx 106 from the upper LLC layer in a "circular sequence numbering" scheme. The circular sequence numbering scheme preferably assigns a number to each frame starting with a "1" for the first frame and sequentially numbers upward for all following frames up to a predetermined number (e.g., 1, 2, 3, 4, 5, 6, 7, . . . 20). In this example, the predetermined number is "20." Once frames up to 20 are received in FIFO Tx 106, the next received frame will again be numbered as "1." Accordingly, the numbering scheme is circular.

Therefore, when flow based MAC 150 transmits to a receiving station, network flow managing FIFO Tx controller 110 will keep track of the numbers assigned to each frame, and will therefore be able to ascertain the frame number of a frame that may be involved in a collision. By way of example, if frame number "5" is involved in a collision, frames 5–20 would be re-transmitted directly from those stored (i.e., buffered) in FIFO Tx 106. As a result, while transmissions are in progress, frames stored in FIFO Tx 106 are preferably "not flushed" until an acknowledge (Ack) signal indicating a successful transmission is received from a receiving station. If a collision occurs, a standard back-off operation is preferably performed as defined in the 802.3 standard.

In yet another embodiment, control information may be embedded within packets buffered in FIFO Tx 106. In this manner, the processing parameters may be modifiable in a pipe-lined packet-by-packet basis. By way of example, the embedded control information may contain modifications to the processing parameters as well as identifying information to single out a particular packet for modification. It should be appreciated that having a smart network flow managing FIFO Tx controller 110 also facilities network management and associated testing protocols. Although few circumstances should require the processing parameters to be changed for each successive packet, it will be appreciated that the ability to modify the processing parameters for any given packet in a packet stream is a powerful feature.

Once network flow managing FIFO Tx controller 110 performs any requested processing based on received control information, micro-RISC stream processor 114*a* advantageously performs various processing and data filtering tasks. By way of example, micro-RISC stream processor 114*a* operates in an in-line manner for modifying data stream characteristics. Preferably, micro-RISC stream processor operates on 32 bit-word portions to efficiently process information along flow based MAC 150 to achieve giga-bit speed performance. Furthermore, instructions are preferably triggered off of the byte stream. In this embodiment, micro-RISC stream processor 114*a* is also suited to operate in different addressing modes such as relative byte count mode.

Internally, micro-RISC stream processor 114*a* will preferably have a set of general purpose registers, data structure registers, and special functional units. By way of example, the functional units may include an ALU, count aggregators, and checksum accumulation units. Further, micro-RISC stream processor 114*a* is preferably capable of operating in a conditional, branch, and loop mode which provides additional flexibility and improved performance. Finally, micro-RISC stream processor 114*a* processing instructions may include a number of inventive packet field manipulations.

Exemplary manipulations may include: CUT, CLEAR, COPY, APPEND, INSERT, AND, OR, XOR, for specialized header generation, separating data and headers, IP_CHKSUM checking and length calculation.

Still referring to FIG. 2, once appropriate data and control information is processed within micro-RISC stream processor 114*a*, data is transferred via a data path 113*a* to a SUPERMAC Tx controller 118 which is preferably a state machine configured to process packets received from micro-RISC stream processor 114*a* and output the processed packets to a physical (PHY) medium 140. As will be described in greater detail below, the transmitting SUPERMAC Tx controller 118 will be primarily responsible for appending appropriate hooks for performing management tasks and processing requested packet structure modifications. In this manner, a variety of packet modifications and management operations may be advantageously carried out by the flow based MAC 150.

By way of example, SUPERMAC Tx controller 118 is preferably suited to process packet modifications such as "disable" preamble appending, "disable" CRC appending, modify (e.g., custom program) inter packet gap (IPG), and program a minimum packet size (e.g., enlarge or decrease a standard 64 byte packet minimum to any arbitrary number) in an in-line packet-by-packet manner. In this embodiment, packet modification control may be simultaneously passed from micro-RISC stream processor 114*a* to SUPERMAC Tx controller 118 via a control path 113*b*. As mentioned above, having the ability to pass control information (e.g., path 113*b*) simultaneously as packet data information (e.g., path 113*a*) is being processed allows SUPERMAC Tx to perform processing modifications in a packet-by-packet basis as contrasted with prior art systems that pass both control and packet information in a serial manner.

By way of example, prior art MAC controllers generally passed initial control information that would apply to all packets that serially followed the initial control information. Accordingly, no change or modification to packet processing was allowed within a MAC controller until new control information was passed. Of course, when control information was passed, packet information would have to be queued, which disadvantageously slowed processing and transmitting speeds. However, the inventive SUPERMAC Tx controller 118 simultaneously processes packet data and modifies processing based on any parallel received control information. Other advantageous features associated with SUPERMAC Tx controller 118 will be described in greater detail below.

FIG. 2 also shows a SUPERMAC management block 117 that is responsible for interfacing between transmitting SUPERMAC Tx controller 118 and a receiving SUPERMAC Rx controller 120. SUPERMAC management block 117 also interfaces with network flow managing FIFO Tx controller 110, a network flow managing FIFO Rx controller 112, and network data BIC 104. Generally, SUPERMAC management block 117 functions as an interface that receives flow control information, auto negotiation commands, physical management commands, and pause frame information (i.e., pause frames are used by a receiving unit to notify a transmitting unit to cease the transmission of data until a receiving buffer is free).

Also performed within SUPERMAC management block 117 is link, start-up and configuration, simulated collisions, forced transmissions, and link monitoring. Furthermore, SUPERMAC management 117 is advantageously suited to prevent transmission from SUPERMAC Tx controller 118 until FIFO Tx 106 is appropriately loaded, or a predetermined period of time is lapsed. As can be appreciated, this enables precisely controlling the rate at which packets are transmitted to PHY medium 140. Alternatively, SUPERMAC management block 117 may also set transmission to occur as soon as packets are received by FIFO Tx 106.

In this embodiment, SUPERMAC Tx controller 118 and SUPERMAC Rx controller 120 are shown linked to a second micro-RISC stream processor 114*b* that is preferably contained within a parallel event processor (PEP) 124. In this embodiment, appropriate processing events occurring within SUPERMAC Tx controller 118 and SUPERMAC Rx controller 120 may be transferred to micro-RISC stream processor 114*b*. In this manner, the processing events occurring within the SUPERMAC's may be stored within appropriate statistical counters 128 of PEP 124.

On the receiving side, micro-RISC stream processor 114*a* is also shown coupled to micro-RISC stream processor 114*b* in order to monitor and keep track of events being processed in and out of flow based MAC 150. Typically, data is received from a physical (PHY) medium 141 that may include a decoder for decoding the signals into appropriate packets that are received by Rx SUPERMAC controller 120. As will be described in greater detail below, SUPERMAC Rx controller 120 is typically responsible for functions such as, e.g., stripping the preamble (if a preamble was appended at the transmitting side) from the incoming packet.

Also, SUPERMAC Rx controller 120 is preferably capable of passing CRC fields to micro-RISC stream processor 114*a* without performing a conventional stripping function. If this happens, CRC stripping may be performed by micro-RISC stream processor 114*a* itself before passing the received packet data to the upper LLC layer. Further, SUPERMAC Rx controller 120 may also perform IPG capture, time-stamped receives, and program a minimum and maximum packet size to avoid continually padding short packets or returning an error for large packets that may be transmitted at gigabit speeds or greater. Of course, pad stripping may also be performed within SUPERMAC Rx controller 120 if desired. Once SUPERMAC Rx controller 120 receives an a packet from physical medium 141, the packet is transferred to micro-RISC stream processor 114*a* for processing and then to a multi-packet queue FIFO Rx 108.

As in the transmitting side, events performed in SUPERMAC Rx controller 120, and micro-RISC stream processor 114*a* are both linked to micro-RISC stream processor 114*b* which accounts for those events in statistical counters 128. Preferably, network flow managing FIFO Rx controller 112 is further capable of assigning a number to each of the packets received by FIFO Rx 108. Because FIFO Rx controller 112 is knowledgeable of the numbers assigned to each packet, a control signal may be transferred to FIFO Rx controller 112 requesting that a particular numbered packet stored in FIFO Rx 108 be transferred (i.e., to LLC layer or PEP 124 for management purposes). Once data is transferred out of multi-packet queue FIFO Rx 108 and into network data BIC 104, in a switched environment, data is passed through data path 144*b* onto network data system bus 101. Of course, a single bi-directional data path may alternatively be used in place of paths 144*a* and 144*b*.

As mentioned above, one advantageous feature of the present invention is its parallel data and control processing architecture. In FIG. 2, management/control bus 102 is generally used for passing control signals and performing network management tasks through a separate dedicated streaming control bus interface controller (BIC) 122. In this embodiment, streaming BIC 122 is preferably implemented for passing control information and performing data management tasks. By way of example, in performing a network management task, it may be necessary to pull (i.e., filter) a particular packet of information from the path of packets being processed through network data BIC 104. Once the desired packet is identified, it may then be filtered by micro-RISC stream processor 114*b* that lies within parallel event processor (PEP) 124.

Micro-RISC stream processor 114*b* is also preferably responsible for programming new events, filtering desired packets and buffering the desired packets in suitable buffers. Further, micro-RISC stream processor 114*b* is also capable of initiating programmable thresholding, alarm generation, and detection of flows for matrix statistics generation. In addition, a basic set of hardwired counters may also be provided to account for various processing operations performed by micro-RISC stream processor 114*b*.

In this embodiment, network management operations are generally used for determining selected network statistics such as throughput, utilization, number of collisions, traffic flow characteristics, etc. Advantageously, simple network management protocols (SNMP), and remote monitoring (RMON) may also be implemented through PEP 124 of FIG. 2. As is well known in the art, RMON monitoring allows a network manager to analyze various traffic statistics and network parameters for comprehensive network fault diagnostics, planning and performance tuning.

Accordingly, PEP 124 includes an inventive packet buffer 125 for storing appropriate packets that are implemented by the network management protocols such as SNMP and RMON. By way of example, if a user wants to monitor certain packets within the data stream being processed through network data BIC 104, the micro-RISC stream processor 114*a* and 114*b* will filter out the desired packets that are subsequently stored in packet buffer 125. Also included within PEP 124 is command and status registers 126, such that the command registers receive associated control signals from management/control bus 102 through streaming control BIC 122.

Also shown are statistical counters 128 that are responsible for storing particular events that may be occurring within SUPERMAC Tx controller 118, SUPERMAC management block 117, SUPERMAC Rx controller 120, micro-RISC stream processor 114*a*, and micro-RISC stream processor 114*b*. Accordingly, as packets are processed and events occur, the event information is streamed into micro-RISC stream processor 114*b* and then stored in statistical counters 128. Further, a plurality of programmable counters 130 are provided within PEP 124 for keeping track of new events that may be undefined at present time, but may be defined at a future date.

In summary, the advantages of the architecture described with reference to FIG. 2 are numerous. Broadly speaking, the described architecture is capable of processing data and control information in a parallel streamlined manner. In addition, the parallel processing feature allows users to perform desired management tasks as packet data is being processed through a streamlined data path. Further, the parallel processing nature enables modifications to the packet structure (e.g., in response to control information) on an in-line packet-by-packet basis. While such a described architecture is believed to work particularly well, it should be appreciated that similar functionalities can be accomplished using other architectures as well.

Figure 3:
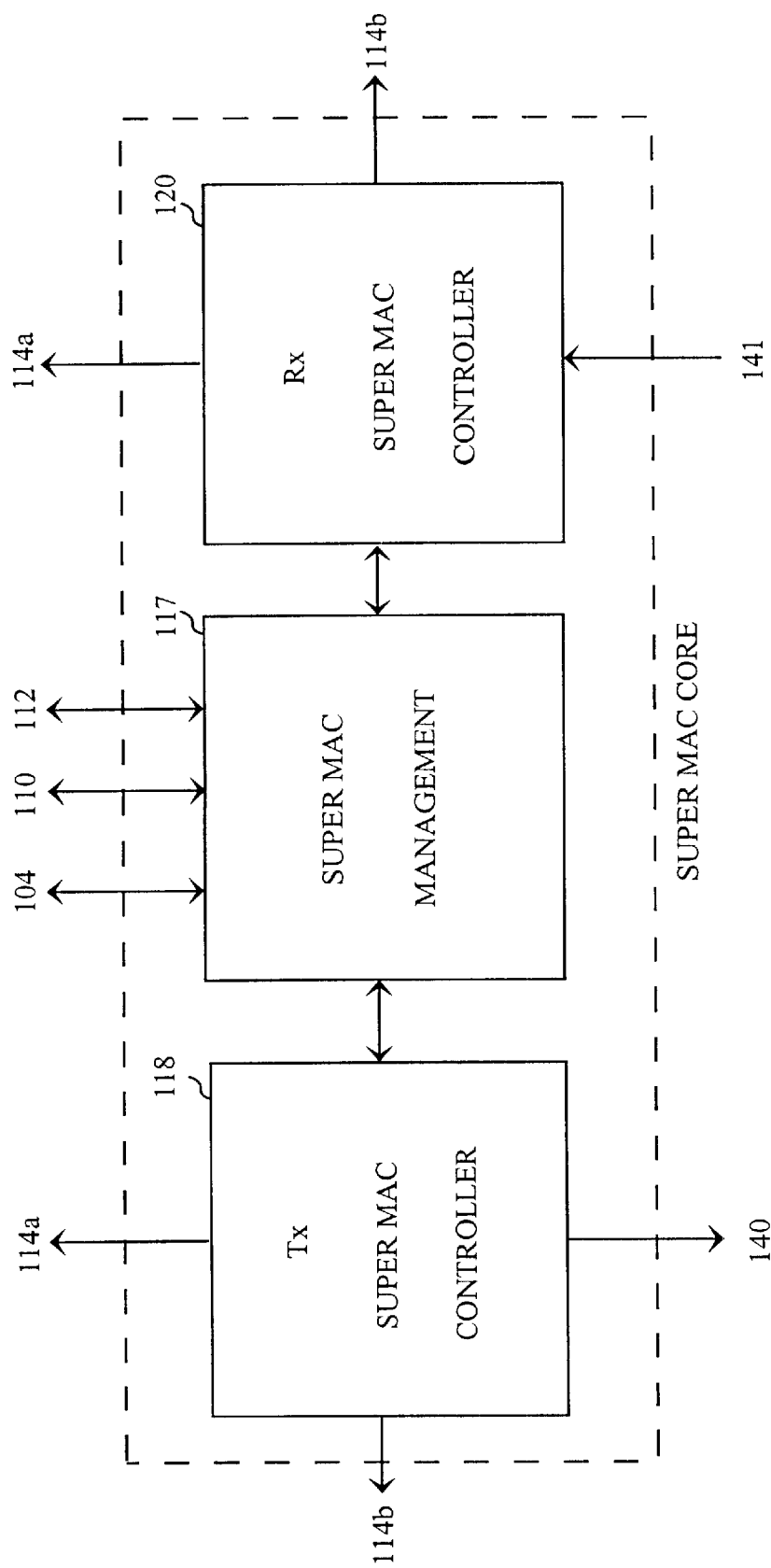
FIG. 3 is a more detailed block diagram illustrating the transmission, management and receiving functions performed within a logic core in accordance with one embodiment of the present invention.

FIG. 3 is a block diagram of a SUPERMAC CORE 116 that includes SUPERMAC Tx controller 118, SUPERMAC management block 117, and Rx SUPERMAC controller 120. In one embodiment, SUPERMAC Tx controller 118 includes various state machines responsible for processing data received from the upper LLC layer, and incorporating appropriate hooks into the processed packets before being transferred to physical medium 140. Likewise, SUPERMAC Rx controller 120 communicates with the physical medium 141 on the receive side, and micro-RISC stream processor 114a and 114b and SUPERMAC management block 117.

In this embodiment, SUPERMAC management 117 interfaces with SUPERMAC Tx controller 118 and SUPERMAC Rx controller 120 for synchronizing a variety of transmission and receiving protocols. By way of example, auto negotiation protocols may be controlled from SUPERMAC management 117 in order to synchronize transmitting and receiving networks to the most efficient and fastest communication speed. By way of example, if a transmitter is capable of transmitting at gigabit speed and the receiver is only capable of receiving at 100 Mbps, then, the transmitter will adjust its speed to meet the receiver's lower speed. Auto negotiation is also described in the IEEE 802.3(u) standard which is hereby incorporated by reference.

SUPERMAC management block 117 is also responsible for controlling when packets are transmitted out of SUPERMAC Tx controller 118 and into PHY 140. By way of example, SUPERMAC management block 117 may communicate to network flow management FIFO Tx controller 110 which informs multi-packet queue FIFO Tx 106 when to transfer data to micro-RISC stream processor 114a and to SUPERMAC Tx controller 118 for transmission. Advantageously, SUPERMAC management 117 is capable of controlling when multi-packet queue FIFO Tx 106 is to transmit or hold data.

Therefore, once SUPERMAC management 117 instructs FIFO Tx controller 110 that data transmission is appropriate (e.g., after a predetermined number of packets are stored in FIFO Tx 106), SUPERMAC management block 117 may signal that transmission is now allowed. On the other hand, SUPERMAC management block 117 may also allow FIFO Tx controller 110 to transmit packets out of multi-packet queue FIFO Tx 106 as soon as packets are received. A more detailed discussion of the functional blocks and processing functions performed within SUPERMAC Tx controller 118 (i.e., transmitter side), and SUPERMAC Rx controller 120 (i.e., receiver side) will now be addressed below.

1. TRANSMITTER SIDE

Figure 4:
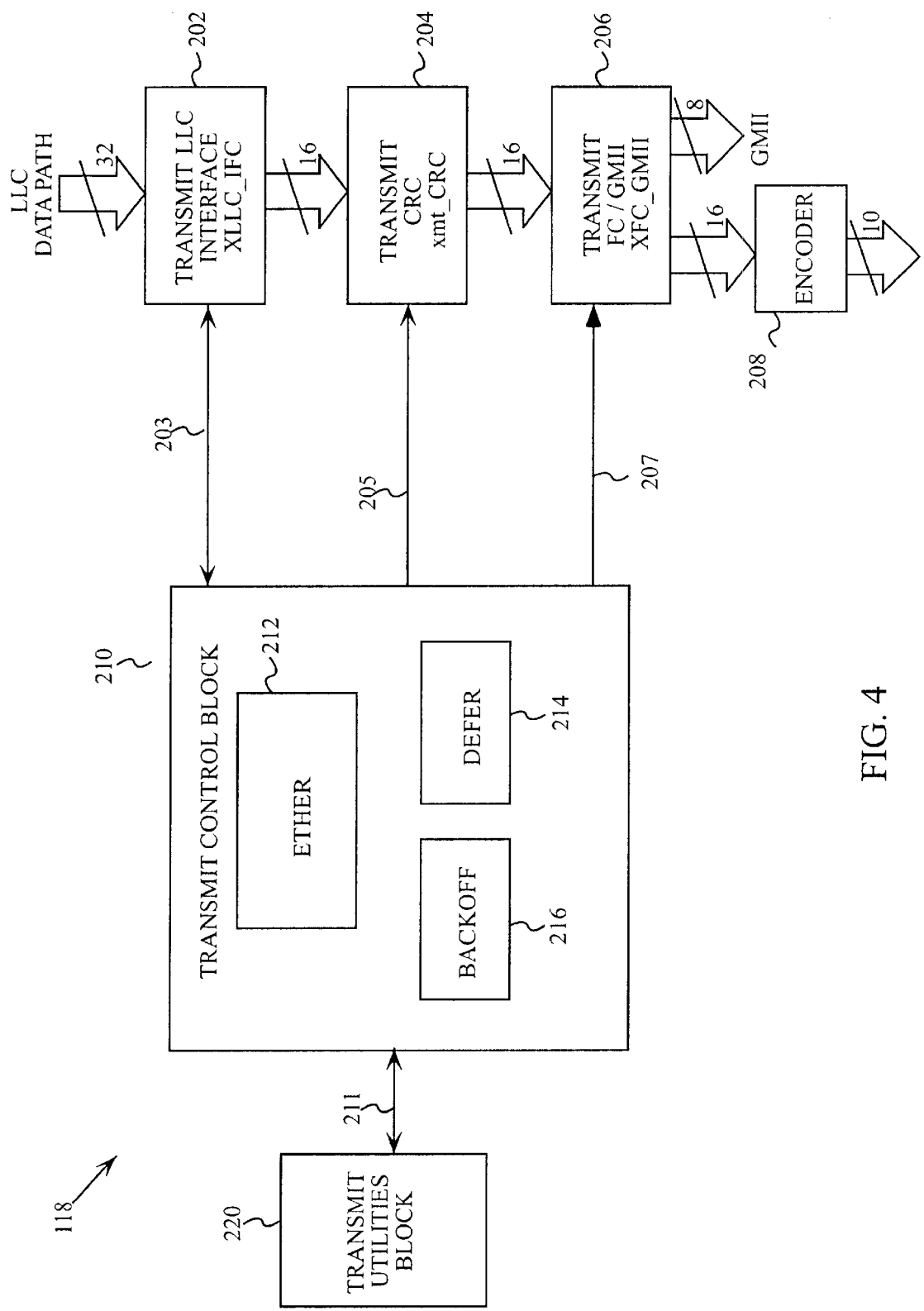
FIG. 4 is a block diagram of the internal architecture of a transmitter controller in accordance with one embodiment of the present invention.

FIG. 4 is a block diagram of the internal architecture of SUPERMAC Tx controller 118 in accordance with one embodiment of the present invention. As shown, a 32-bit wide data path is shown being passed into a Transmit LLC Interface 202 (XLLC_IFC). In Transmit LLC Interface 202, various processing operations may be performed on data that is being received from an upper LLC layer. By way of example, functionalities controlled by registers contained within Transmit LLC Interface 202 may include: (1) programming a desired defer period; (2) programming a desired slot time (i.e., unit of backoff); (3) programming a retry limit; programming a minimum and maximum packet size, etc.

Also contained within Transmit LLC Interface 202 is a command protocol register 302 that contains plurality of flags for modifying packet processing in accordance with one embodiment of the present invention. By way of example, command protocol register 302 may contain flags for: (a) enabling/disabling a preamble generation and appending; (b) enabling/disabling a CRC calculation and appending; (c) enabling/disabling a carrier extension requirement (i.e., that the packet be at least 512 bytes long); (d) controlling a full duplex mode; (e) enabling/disabling an autopadding function; (f) enabling a start sample line function; (g) performing a force transmit (i.e., forcing a collision to analyze a network's response); and (h) enabling the transmission process.

Following the illustrated data path, a 16-bit wide data bus transfers packet information to a Transmit CRC 204 (XMT_CRC) in accordance with one embodiment of the present invention. Once the data is passed to Transmit CRC 204, a CRC calculation will either be performed, or by-passed depending on the setting of the CRC flag contained within the command protocol register. It should be understood that while packet information is being passed and processed down the data path, control information may be simultaneously passed to modify packet processing at anytime. By way of example, if a packet is in the process of being processed in Transmit CRC 202, and control information (i.e., Flag is set to TRUE=NO CRC) disabling CRC is passed just before the CRC is appended, no CRC will be appended in Transmit CRC 202.

Once data is processed through Transmit 204, the 16-bit data is passed to a Transmit FC/GMII 206 (XFC_GMII) block that is responsible for processing the received packet information into an appropriate form for transmission over a physical medium. By way of example, the described high speed flow based MAC 150 is preferably capable of simultaneously transmitting in a gigabit media independent interface (GMII) form and in a Fiber Channel form. Of course, it should be understood that the gigabit Flow based MAC 150 is also fully downward compatible to 10 Mbps systems.

By way of example, transmission may also be performed in a media independent interface (Mil) form, and transmission may also be carried out in one form at a time. That is, although simultaneous transmission is possible, GMII or Fiber Channel transmission may be carried out one at a time. If transmission is carried out through a Fiber Channel transmission, it may be necessary to perform suitable Fiber Channel encoding in an encoder 208 which receives a 16-bit wide data line and outputs a Fiber Channel specific 10-bit wide output. It should also be appreciated that the functions performed by encoder 208 may alternatively be performed within a media independent Transmit FC/GMII 206 without the need for a separate encoder unit.

As data is passed through blocks 202, 204 and 206, a bidirectional communication link 203 is maintained between block 202 and a transmit control block 210 containing three separate processing blocks referred to herein as ETHER 112, BACKOFF 216, and DEFER 214. Further shown are two separate communication links 205 and 207 that are respectively used for communicating from transmit control block 210 to Transmit LLC Interface 204 and Transmit FC/GMII 206. Generally, communication links 205 and 207 are used for controlling and modifying processing operations within blocks 204 and 206 in the aforementioned packet-by-packet basis.

ETHER 212 is generally responsible for maintaining the integrity of frames being processed through flow based MAC 150 by ensuring that the appropriate Ethernet standards for frames and packets are satisfied. At a higher level, ETHER: (a) ensures that frames are transferred when the medium is not busy; (b) determines whether collisions occur; (b) performs jamming if collisions occur; (c) determines if carrier extension is required; and (d) re-transmits frames after defer and backoff is satisfied. At the packet level, ETHER 212 may also:(e) generate a preamble, if required, (f) generate CRC, if required; and (g) check for collisions. In one embodiment, the tasks performed by ETHER 212 are generally processed by suitable states machines as will be described in greater detail below. Of course, the processing performed by ETHER 212 may be modified at anytime by passing control information in parallel with data processing.

In certain cases, having the capability to disable both the preamble and CRC generation on-the-fly may allow a user to perform various management diagnostics on the network. By way of example, when both the preamble and CRC are both disabled, the flow based MAC 150 is essentially passing raw data without processing. With this arrangement, important diagnostic tests and management operations may be performed on the transmitted data (i.e., the data transmitted without preamble and CRC). In another embodiment, a user may load a bit pattern sequence for performing phase locked loop (PLL) checks, and various laser optics checks. In practice, the above described testing functionalities may be performed by implementing suitable software user interfaces that implement the various hooks enabled by the SUPERMAC CORE 116. In addition, the aforementioned testing may be performed without having to employ expensive conventional test equipment.

As described above, transmit control block 210 also contains BACKOFF block 216 which is preferably a state machine that is responsible for determining the length of time the transmitter must wait before a retry transmission takes place after a collision. Generally speaking, backoff time is expressed in terms of "units of backoff," and the total time lapsed before re-transmission is attempted (i.e., after a collision) is a certain number of units of backoff. To determine the certain number of "units of backoff" the transmitter must wait before a transmission is re-attempted, a IEEE standard algorithm may be used for calculating the units of backoff. Although other suitable algorithms may be used for calculating the number of units of backoff, preferably, a truncated binary exponential BACKOFF (TBEB) algorithm is implemented. Further, it is important to note that "units of backoff" are also referred to as "slot time." Conventionally, slot time is a fixed period of time (i.e., 512 bit-times) for both 10 and 100 Mbps transmission speed networks. A particularly advantageous feature of the present invention is that "slot time" is programmable to any suitable number of bit-times. By way of example, for gigabit Ethernet transmissions "slot time" may be programmed to any suitable number of bytes-times up to a preferred number of bytes that may be 512 byte-times. In a further embodiment, a conventional "retry limit" of 16 retries may also be programmed to any suitable number of retries. By way of example, after an unsuccessful attempt at transmission, the transmitter will backoff and re-attempt the transmit up to 16 times before an error is received (i.e., indicating that medium is very busy or disconnected). It should be appreciated that allowing retry limit programmability further facilitates network flow optimization.

Also shown is DEFER block 214 that is responsible for maintaining inter packet gaps (IPGs) in accordance with one embodiment of the present invention. By way of example, when it is determined that a signal is currently on the medium (i.e., the medium is busy) no transmission will be attempted for a certain period of time. In one embodiment, the period of time will be calculated based on an IEEE standard algorithm entitled "the ⅔ Rule." For more information on the ⅔ Rule, reference may be made to the IEEE 802.3 standard "Carrier Deference Section 4.2.3.2.1, page 26" (ISO/IEC 8802-3:1996(E) ANSI/IEEE). In general, under a the ⅔ Rule, IPG carrier detection (e.g., to determine if collisions occur) is performed for the first ⅔ of an inter packet gap (IPG) period, and no carrier detection is performed for the last ⅓ of the IPG.

Typically, the ⅔ Rule is followed when a "receive" is followed by a "transmit," and the IPG is set to about 96 bit times or greater. On the other hand, when a "transmit" is followed by a "transmit," the IPG may be set to 96 bit times. In this embodiment, IPG is preferably programmable in that IPG may be made longer or shorter than 96 bit times. This is particularly advantageous since throughput may be increased by decreasing IPG when, e.g., few collisions are being detected.

Also shown communicating with transmit control block 210 through, a bi-directional link 211, is a transmit utilities block 220. In this embodiment, transmit utilities block 220 maintains a number of status counters that enable status reporting when appropriate control is passed to determine the status of flow based MAC 150 at any suitable time. Also, transmit utilities block 220 is capable of accounting for transmit latency (through a suitable counter) that is defined as the length of "wait time" that lapsed before a transmission was allowed on the network. Transmit utilities is arranged to keep track of an octet count, a retry status count, a utilization factor for determining the percentage of network use, a bit information, an enable flag, a single collision flag (e.g., to determine if a packet has experienced a single collision), a multiple collision flag, a late collision flag (e.g., indicating that a collision occurred after a particular window of time has expired), a carrier sense error (which only applies to half duplex), and an underflow flag that indicates whether the upper LLC layer failed to provide any requested data.

The following table illustrates various status data that is gathered by transmit utilities block 220 of FIG. 4 in the described embodiment. Of course, the transmit utilities block may be arranged to obtain other data as well. In general, utilization counters typically reload upon underflow and overflow, and utilization is preferably measured in terms of 64 bytes.

TABLE 1

| xmt2hst_stat | |
|---|---|
| xmtEnabled | Transmitter is enabled |
| colSingle | there was one retry attempt |
| colMultiple | there were more than one retries |
| colLate | Collision occurred after the collision window was over. |
| errorCRS | Either carrier sense did not appear at all or it came and went off during the transmission. |
| errorUnderflow | "hst2xmt_data_rdy" was not there when it was required. |
| retryCnt | Retry count during this transmission |
| xmtLatency | Byte counts in this packet (Latency counter also) |
| ctrOverflow | Counter overflowed (applicable to both byte counter and latency counter) |
| UtilFactor | Utilization factor |

Figure 4A:
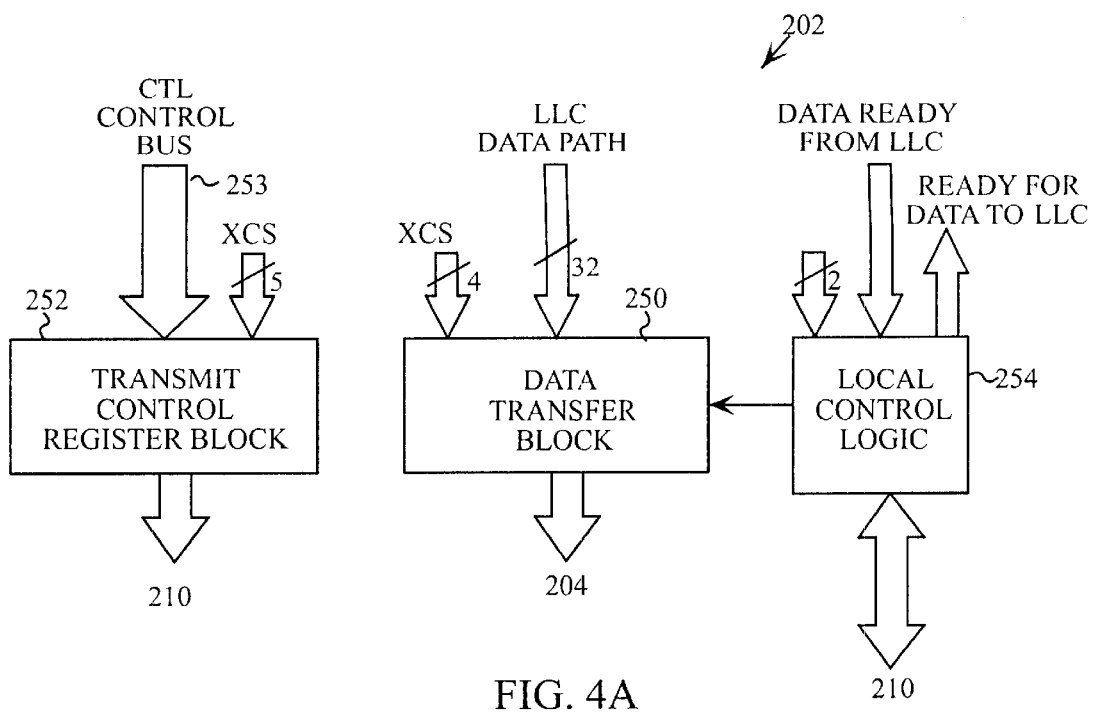
FIG. 4A is a more detailed block diagram of the functional blocks contained within Transmit LLC Interface of FIG. 4 in accordance with one embodiment of the present invention.

A state machine diagram further illustrates some of the functionality of the transmit utilities block 220 as described below with reference to FIG. 5A. FIG. 4A is a more detailed block diagram of the functional blocks contained within Transmit LLC Interface 202 of FIG. 4 in accordance with one embodiment of the present invention. As shown, a 32-bit wide LLC data path is input into a data transfer block 250 that also receives 4-bits of control information from a transfer control signal (XCS) bus. In addition, a control (CTL) bus 253 is used to pass control information from multi-packet FIFO Tx 106 and micro-RISC stream processor 114a (of FIG. 2) into a transmit control register block 252. In this embodiment, control bus 253 is preferably identified as "hst2xmt_ctl." In this manner, when appropriate control signals are passed through control bus 253 into control register block 252, appropriate registers within control register block 252 may be selected and set to enable appropriately desired processing functions within SUPERMAC Tx controller 118 of FIG. 3.

Further shown is a 5-bit wide control signal XCS entering control register block 252 that is used for selecting registers and setting latching times for the selected registers. Also contained within Transmit LLC Interface 202 is a local control logic block 254 that preferably receives a 2-bit wide XCS control signal that defines the boundary and mode of packet transfer. The following is an exemplary table 2 illustrating the various transmit control signals that may be implemented in accordance with one embodiment of the present invention.

TABLE 2 hst2xmt_xcs

| | |
|---|---|
| testMode | Put the transmitter in test mode |
| hstClk | Carries the host clock |
| cmdValid | Command is valid on hst2xmt_ctl bus |
| retCntValid | Retry counter is on hst2xmt_ctl bus |
| slotTimeValid | Slot Time is on hst2xmt_ctl bus |
| defPeriodValid | Defer period is on hst2xmt_ctl bus |
| pktValid | Packet is valid and transmission may start |
| idleValid | Host wants to control TXD when transmitter is idle |
| byteEnables | Corresponding byte is valid on the hst2xmt_data bus |
| kIndex | These are source of KGEN TX_EN, or TX_ER outputs |

In one embodiment, before a data transfer is performed, a handshake is preferably satisfied between flow based MAC 150 and the upper LLC layer. By way of example, one suitable handshake may be a signal transmitted by the LLC layer indicating that data is ready (e.g., Flag hst2xmt_data_rdy) and a signal transmitted by flow based MAC 150 indicating that it is ready for data (e.g., Flag xmt2hst_rdy4data).

Once the appropriate flags have been set, and the handshake has been verified (i.e., packet valid), the data may then be transferred through data bus (i.e., hst2xmt_data) between the upper LLC layer and the flow based MAC 150. For reference, FIG. 4A shows data leaving transfer block 250 and going to transmit CRC 204 as described in FIG. 4, and control information containing the appropriate register selection performed in local control logic 252 is transmitted to transmit control block 210.

As described above, the control information set in transmit control register block 252 is then used by ETHER 212 and is subsequently communicated back to the flow of data processing via communication links 203, 205 and 207. By way of example, if registers within transmit control register block 252 are set to avoid appending a preamble to the data being processed in SUPERMAC Tx controller 118, then processing will be performed within ETHER 212 and then transferred back via communication link 203 to Transmit LLC Interface 202. Accordingly, local control logic 254 also receives control from transmit control block 210 which is preferably coming from ETHER 212.

In this manner, the appropriate settings in control register block 252 are implemented independently and simultaneously with data being transferred and processed through the data path. To further emphasize the advantages associated with processing control and data in parallel, it is useful to realize that while data is being processed, control information may be received to modify data processing without having to wait for data to be completely processed.

In this embodiment, local control logic 254 is preferably capable of communicating both "to and from" transmit control block 210 to set the appropriate parameters for BACKOFF block 216 and DEFER block 214. Other signals that may be used are, for example, a "xmt2hst_abort" which may be transferred directly to ETHER 212 to discontinue any current transmission. Table 3 below shows exemplary control signals "xmt2hst_rsp" that come directly from control bus 253.

TABLE 3 xmt2hst_rsp

| | | |
|---|---|---|
| xmtClk | | Transmitter clock |
| fdplx | | Full duplex mode |
| xmtOK | | Transmission completed (it may have error too) |
| xmtCol | | Xmitter collided (can be used to reset FIFO pointers) |
| latencyValid | | The information on the byte counter is transmission latency |
| octsValid | | The status bus (xmt2hst_stat(23:13) carry octet count information |
| utilValid | (00) | Counter working |
| | (01) | It underflowed |
| | (10) | It overflowed |
| loadData | | This signal may be used by those hosts which operate at /2 frequency. It is an alternative to xmt2hst_rdy4data. |

Figure 4B:
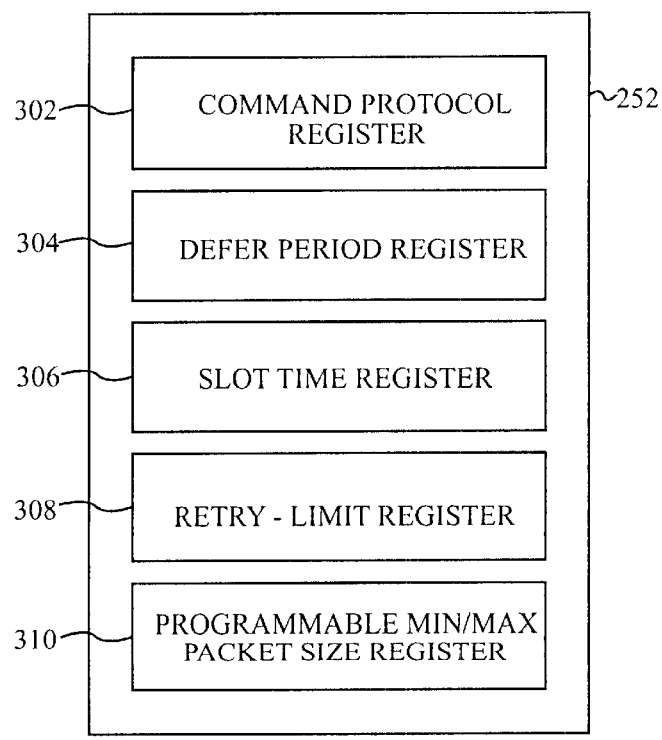
FIG. 4B is an exemplary illustration of control registers that may be contained within a control register block in accordance with one embodiment of the present invention.

FIG. 4B illustrates the aforementioned control registers that may be contained within control register block 252 in accordance with one embodiment of the present invention. As shown, a command protocol register 302, a defer period register 304, a slot time register 306, a retry limit register 308, and a programmable min/max packet size register 310, are contained within transmit control register block 252. Thus, when selected control signals CTL and XCS are transferred to transmit control register block 252, the attributes of the selected registers may be changed. In this manner, the processing performed by SUPERMAC Tx 118 may modified.

By way of example, if a user desires to program a particular custom retry limit, retry limit register 308 may be selected by passing a control signal and a desired latching time. Once latched, a new retry limit will be programmed into retry limit register 308. In this embodiment, retry limit register 308 may be a 5-bit register that is programmable to any desired "number" between about 0 and about 31. The programmable nature of retry limit register 308 is especially useful in performing network flow management. By way of example, if the "fixed" 802.3 standard defined retry limit of "16" results in too many packets being dropped, the retry limit may simply be adjusted upward to reduce the number of dropped packets.

Likewise, defer period register 304 may be a 3 bit register (or any other suitable size register) that may preferably be programmable to any number between about 32 bit-times and about 1024 bit-times, and more preferably between about 32 bit-times and about 512 bit-times, and most preferably between about 32 bit-times and about 128 bit-times. In one example, defer period register 304 may be programmed to about 96 bit-times. Because the defer period is generally the inter packet gap (IPG), when a user programs the defer period, a modification is made to the IPG of packets being transmitted. As a result to the change in IPG, the "rate" at which packets are being transferred may be increased or decreased. With this configuration, the slot time may also be programmed to any even number between about 2 bytes and about 510 bytes. In this embodiment, slot time register 306 is preferably an 8-bit register (or any other suitable size register). By way of example, when the 8-bit register is all ones (i.e., 11111111), the total number of bits is 255 bits. When the 255 bits are multiplied by the slot time which may be 16, the total number of bits will be 4,080 bits or 510 bytes.

Finally, programmable min/max packet size register 310 allows a user to program the desired size for a transmitted packet. By way of example, conventional standard defined packets have a fixed minimum size of 64 bytes, however, it is contemplated that packets transferred in a high speed network (e.g., gigabit speeds or greater) may require larger minimum packet sizes. To accommodate this possibility, programmable min/max packet register is advantageously provided to enable a user to custom program minimum packet sizes.

FIG. 4C shows the contents of command protocol register 302 that include a number of suitable flags for enabling and disabling processing functions carried out within SUPER-MAC Tx controller 118. The exemplary flags are as follows: (1) an enable XMT 320 flag for initiating a data transfer process; (2) a fdplx 322 flag for enabling full duplex functions (in full duplex, carrier sensing is ignored; (3) an autopad 324 flag for padding packets with extra bits to meet a minimum required size; (4) a no CRC 326 flag for disabling the calculation of CRC; (5) a no preamble 328 flag for disabling the appending of preamble to the beginning of a packet; (6) a no carrier extension 330 flag used to disable a minimum 512 byte carrier packet size that may be required under the gigabit Ethernet standard IEEE 802.3z; (7) a start sample line 332 flag used to begin sampling the transmit line and generate statistics for Block 220; and (8) a force transmit 334 flag used to force a transmit regardless of whether the medium is busy. As can be appreciated, when the appropriate registers are set within control register block 252, the desired packet structure being processed in flow based MAC 150, may be manipulated while data is being transferred.

FIG. 4D is a more detailed representation of Transmit CRC 204 (of FIG. 4) in accordance with one embodiment of the present invention. As shown, a 16-bit wide data path is transferred from data transfer block 250 of FIG. 4A, and is simultaneously passed through CRC computation unit 258 and data path 256. In CRC computation unit 258, a standard cyclic redundancy check computation is performed in accordance with IEEE 802.3 standards defined algorithms. However, as described above, if CRC is not required by setting the appropriate flag 326 to TRUE (as shown in FIG. 4C), then no CRC computation will be performed or appended to the packet being transferred from data transfer block 250.

At this point, after an appropriate CRC computation is performed and appended, if necessary, and the data is passed through data path 256, packet information passing through data path and CRC computation unit 258 will be passed to a suitable multiplexer 260. Once multiplexed, a single 16-bit wide data path will lead to a common control/data path 261 of FIG. 4E.

Figure 4E:
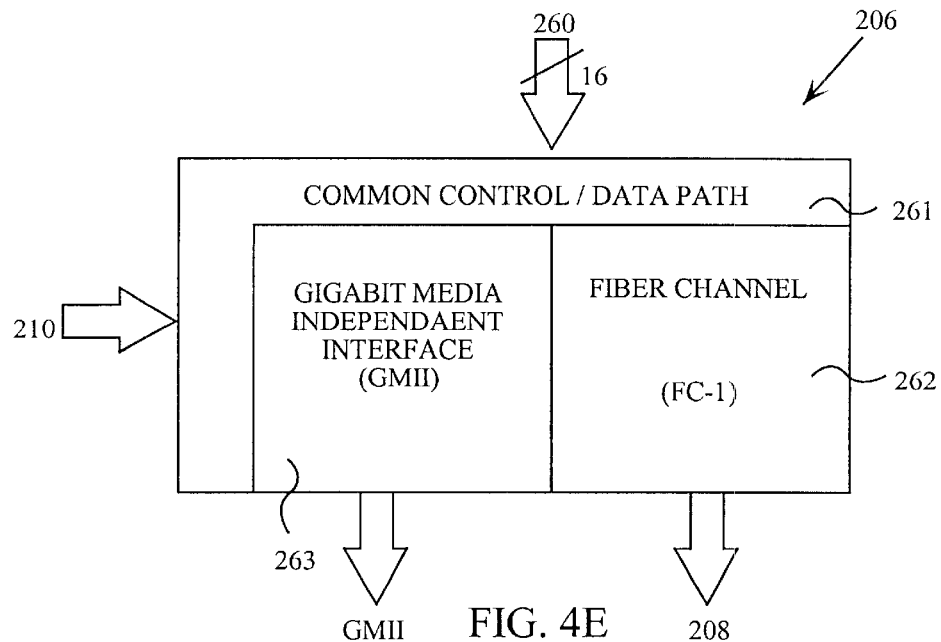
FIG. 4E shows a common control/data path block for receiving 16-bit wide data from a suitable multiplexer in accordance with one embodiment of the present invention.

FIG. 4E shows a common control/data path 261 receiving the 16-bit wide data from multiplexer 260. Upon receiving the data, the data is appropriately channeled to either one or both of the identified physical medium interfacing units. By way of example, one medium interfacing unit may be a gigabit media independent interface (GMII) 263 and the other may be a fiber channel interface (FC-1) 262. As mentioned above, the gigabit flow based MAC 150 of FIG. 2 is fully downward compatible and may therefore transmit through a media independent interface (MII).

In addition, it should be understood that operation of the aforementioned mediums may be performed simultaneously or one at a time. Also shown is common control/data path 261 receiving control information from transmit control block 210 for specifying which mode of operation is desired. Generally speaking, FC-1, GMII, and MII define the standard electrical and mechanical interfaces required between the flow based MAC 150 and a selected physical medium.

In this embodiment, the signals output through fiber channel 262 will preferably include a txd__fc (16-bit wide), kgen (2-bit wide) and a send idle (flag). In general, txd__fc (data) and kgen (control) are mixed to generate suitable transmitting symbols by encoder 208. The signals output through GMII are preferably tx__en (enable), tx__er (error) and txd (data). This information is then appropriately transmitted to the physical medium 140 as shown in FIG. 2.

Furthermore, common control/data path 261 may receive an "idle valid flag" signal from local control logic 254. In one embodiment, when "idle valid flag" is received, suitable symbols may be injected during quite times (i.e., between packets). This is especially useful when a user desires to transmit unique information without increasing the load requirements of a network. By way of example, these special symbols may be transmitted when the network would conventionally be quite (i.e., an IPG period).

Accordingly, the symbols may represent selected programmable idle symbols defined by the 802.3 standard, or custom user defined symbols. In one embodiment, the custom user defined symbols may find particular use when a transmitting station needs to determine the response of a receiving station. That is, when a transmitting station propagates the custom user defined symbols to the receiving station, the receiving station may or may not be able to process the custom user defined symbols, thereby providing the transmitting station with data on the receiving stations capabilities.

Figure 4F:
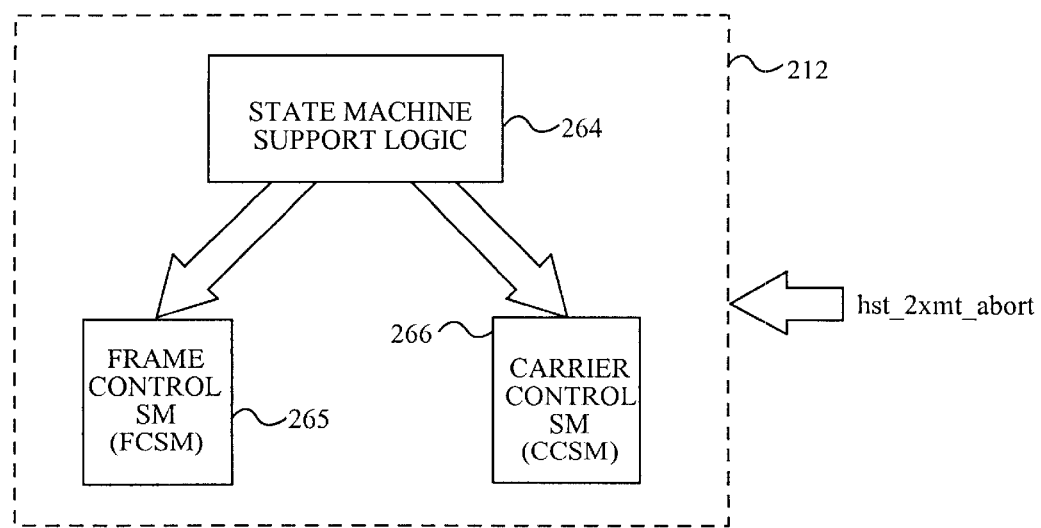
FIG. 4F is a block diagram of support logic and state machines that are preferably contained within an ETHER processing block in accordance with one embodiment of the present invention.

FIG. 4F illustrates the support logic and state machines contained within ETHER 212 in accordance with one embodiment of the present invention. As shown, a state machine support logic 264 is coupled to a frame control state machine (FCSM) 265, and a carrier control state machine (CCSM) 266. State machine support logic 264 is generally used to support the associated state machines' functionality and to generate appropriate intermediate signals. In general, the processing performed by the disclosed state machines may be modified on a packet-by-packet basis through the use of parallel data and control processing paths.

Thus, when the particular registers contained within transmit control register block 252 are modified, the processing parameters within ETHER block 212 will be substantially simultaneously implemented on the data being processed. It should be understood that in prior art systems, modifications were only allowed in between entire packet transmissions (never mid packet). Generally, FCSM 265 is responsible processing data in accordance with the flags set in command protocol register 320. By way of example, if no preamble is requested, no preamble will be generated nor appended. The processing particulars of FCSM 265 will be described in greater detail below with reference to FIG. 8B. Like wise, CCSM 266 is generally responsible for: (a) determining whether a packet has been transmitted without collisions; (b) determining whether jams are required; (c) determining whether packet bursting and carrier extensions are required, etc. The processing particulars of CCSM 266 will also be described in greater detail below with reference to FIG. 8A below.

Still referring to FIG. 4F, a signal entitled "hst2xmt__ abort" is shown directed at ETHER block 212. In one embodiment, hst2xmt__abort will preferably indicate that an immediate discontinuation of processing be initiated (even while a particular frame is being processed). Accordingly, the abort function allows the user to stop transmission at any point of a packet transmission and "flush out" the buffers holding any un-transmitted data. Advantageously, this allows a user to quickly and accurately remove any errors from the network and avoid transmitting unwanted data over the network.

Figure 4G:
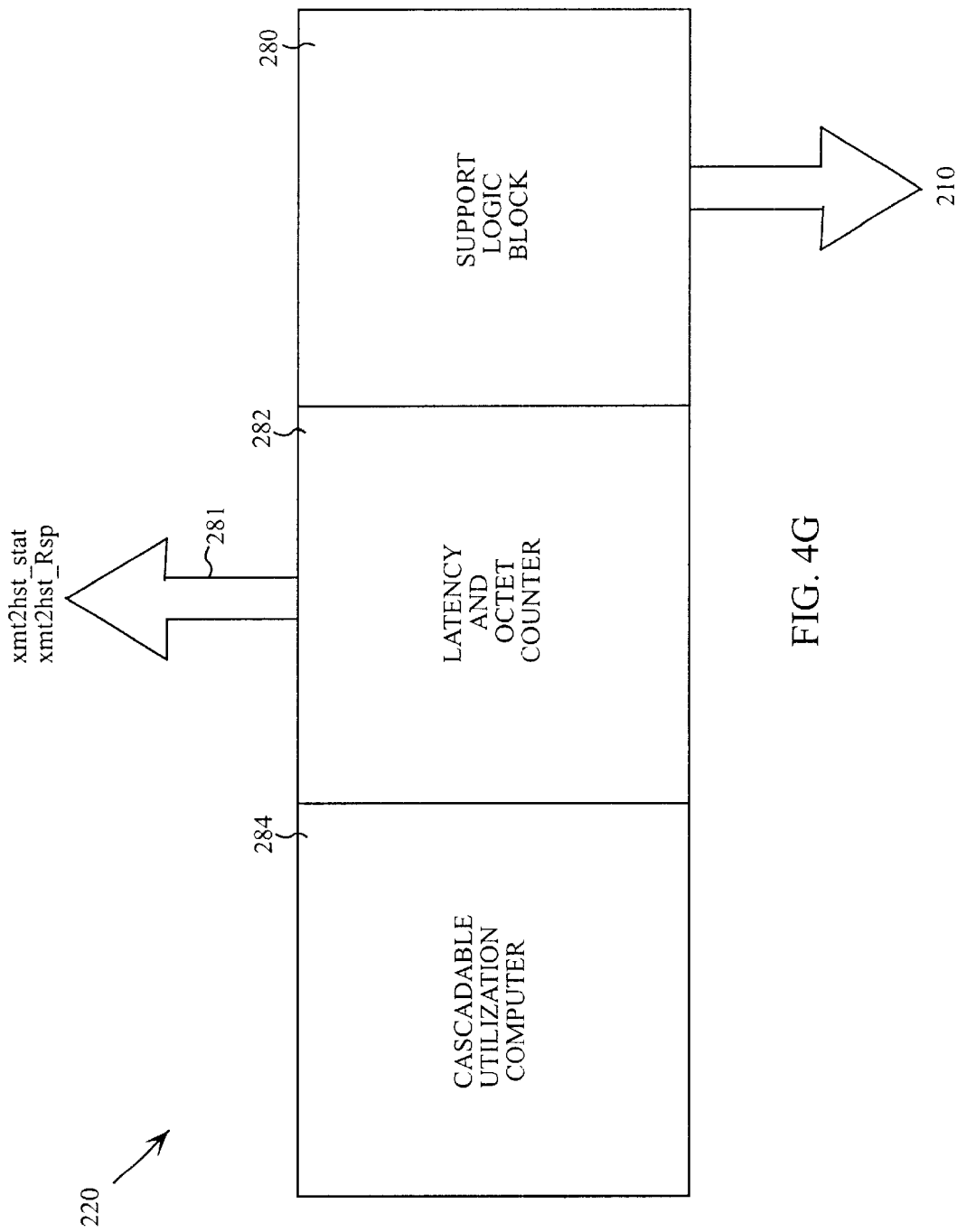
FIG. 4G is a block diagram illustrating in greater detail the functional blocks contained within a transmit utilities block of FIG. 4 in accordance with one embodiment of the present invention.

FIG. 4G is a block diagram illustrating in greater detail the functional blocks contained within transmit utilities block 220 (of FIG. 4) in accordance with one embodiment of the present invention. As shown, a support logic block 280 is preferably used for supporting functions performed within transmit control block 210 that is responsible for setting slot time duration and a minimum carrier packet sizes of about 512 bytes. In the middle block, the latency counter is used for accounting for the time lapsed before a transmission occurred, and the octet counter is used to identify the number of bytes transmitted per packet. In one embodiment, latency is used to define the period of time that passed from when a transmission is requested (e.g., when a packet valid signal has been received and an appropriate handshake was verified), to when a transmission is attempted. Thus, if a collision occurs, a new latency period is preferably calculated. In addition, once this information is calculated, the information is communicated through a bus 281 that transmits control signals "xmt2hst_stat" and xmt2hst_rsp."

As described above, an appropriate handshake to initiate a data transfer is generally a data-ready signal received from the upper LLC layer and a ready-for-data signal transmitted by the MAC layer (to the LLC layer) indicating that the MAC layer is ready to receive data from the LLC layer. Finally, a cascadable utilization computer 284 is used to calculate overflow, and underflow parameters using circuitry that may be increased in a cascadable manner based on a desired "minimum CPU interrupts." By way of example, once the minimum number of CPU interrupts desired is identified, the utilization computer circuitry may be cascaded i.e., replicated and integrated for increased processing power to meet desired processing requirements. Accordingly, the amount of hardware circuitry may be adjusted depending on a user's performance needs.

FIG. 5A is a diagrammatical representation of four packets being transmitted through the flow based MAC 150 in accordance with one embodiment of the present invention. To illustrate the parallel in-packet programmability of the present invention, packet A 502, packet B 504, packet C 506, and packet D 508 are shown being transmitted through flow based media access controller 150 of FIG. 2. Because there is a separate data processing path and a separate control processing path, the data processing being performed on a particular packet that is being passed through the flow based MAC 150, may be modified while the packet is being transmitted.

To illustrate this point, say for example, packet A 502 has already been transmitted with a preamble field, a destination address field, a source address field, a length/type (L/T) field, a LLC data field, and a CRC field. Assume now that a user wants to disable the CRC field for the next transmitted packet B 504. To disable CRC in the next transmitted packet, the user does not have to wait for the next IPG as required by prior art embodiments. In accordance with one embodiment of the present invention, the user may send a control signal disabling CRC for packet B 504 at anytime just after CRC was calculated for packet A 502. As pictorially illustrated, CRC may be disabled at anytime between about time $t_1$ (i.e., just after CRC of last packet) and time $t_2$ (i.e., just before CRC of next packet). As described above, having the ability to change processing protocols on-the-fly for each packet enables custom packet-by-packet processing not available with prior art systems. As such, CRC may be disabled at anytime during the transmission of packet B 504 up until just before the end of LLC data or any suitable pad which is not shown for ease of illustration.

In another example, assume that the user desires to disable the preamble in an upcoming packet. In one embodiment, if preamble disable is desired, then control for disable must be passed before the processing of a suitable preamble. By way of example, once packet C 506 begins transmission, the preamble cannot be disabled, but the preamble may be disabled for the next packet between about a time $t_4$ (i.e., just after the preamble was generated for packet C 506) and an about time $t_5$ (i.e., just before the generation of preamble for packet D 508). As shown, once disabled between $t_4$ and $t_5$, the next packet D 508 did not contain a preamble. It is further important to appreciate that packet D 508 also does not contain a CRC field since it was disabled between $t_1$ and $t_2$ as described above. Of course, if at anytime CRC or preamble is again required, an appropriate control signal may be passed to re-activate the associated generation and appending in a parallel packet-by-packet basis.

In a further embodiment, assume that a user desires to custom-program an existing IPG "time $x_0$" shown between packet A 502 and packet B 504 to a longer time span. To modify the IPG, the user may simply pass an appropriate control signal in order to modify the IPG between any identified packets. In this example, the user may want to increase IPG starting between packet C 506 and packet D 508. To complete the modification, the user must pass appropriate control between about a time $t_6$ (i.e., just after packet B 504 and about a time $t_7$ (i.e., just before the end of LLC data or any suitable pad of packet C 506). Of course, if packet C 506 contained a CRC field, $t_7$ would be just before the end of the appropriate CRC field.

As shown, the programmability of IPG has now been implemented, and the IPG time span is now "time $x_0+x_1$." Once programmed, the new IPG will remain until once again modified in accordance with this embodiment. It should also be appreciated that having the ability to modify IPG enables a network manager to modify the rate at which packets are being transmitted across a medium. By way of example, if IPG increases, fewer packets will be transmitted during a particular period of time. On the other hand, if IPG decreases, more packets will be transmitted during the same period of time.

Figure 5B:
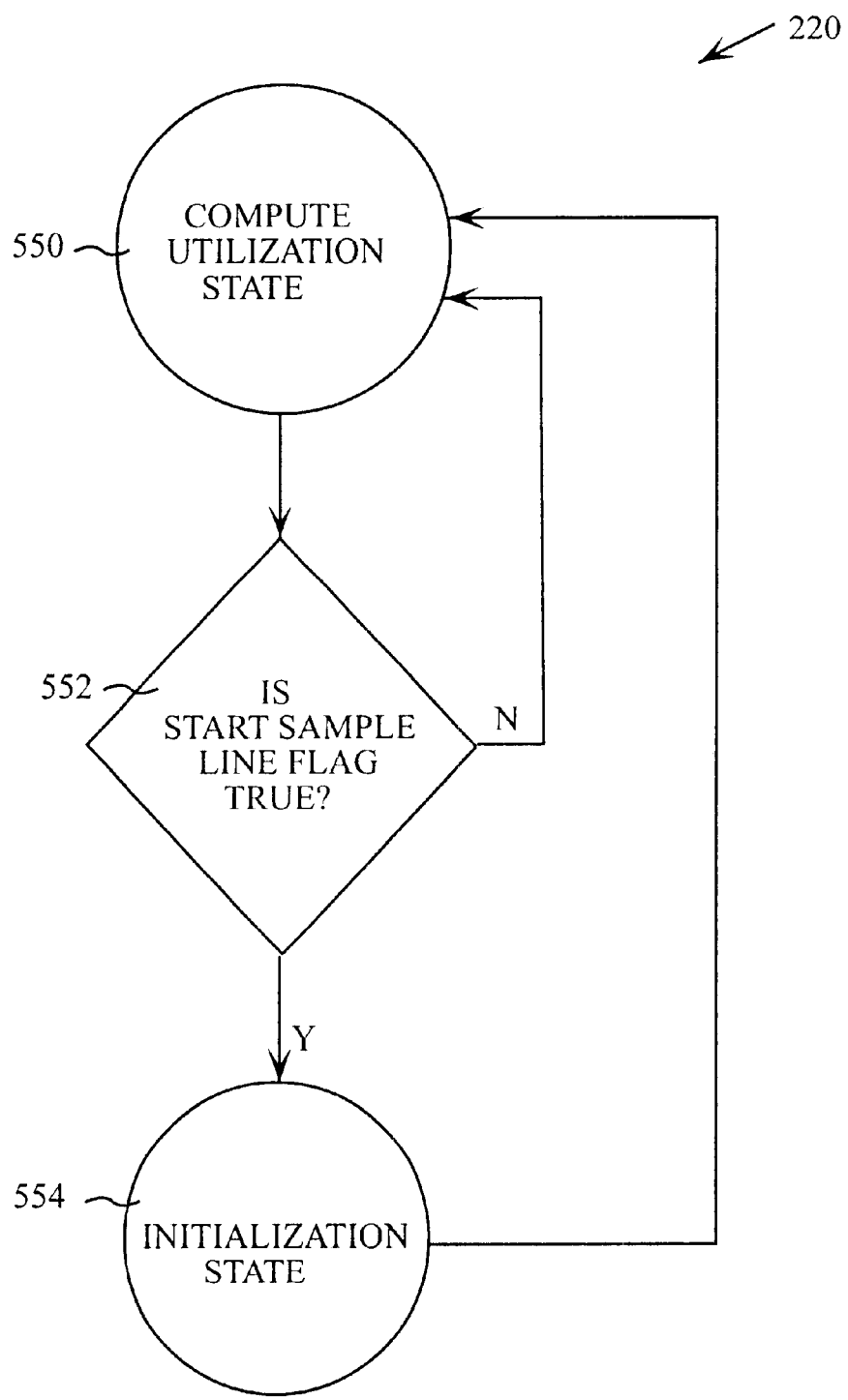
FIG. 5B is a state machine diagram that may be implemented within a transmit utilities block of FIG. 4 in accordance with one embodiment of the present invention.

FIG. 5B is a state machine diagram that is implemented within transmit utilities block 220 (of FIG. 4) in accordance with one embodiment of the present invention. In this embodiment, the state machine is continually calculating the aforementioned utilization parameters in a state 550. Accordingly, as processing is performed within transmit control block, the status counters within transmit utilities block 210 area always being updated. In this manner, the counters contained within compute utilization state 550 may be read at anytime on demand. If at anytime a start sample line flag 332 (of FIG. 4C) is set to true in condition 552, the state will go to an initialization state 554 where the registers are cleared and the compute utilization state 550 again resumes computing the processing status from scratch. If the condition "start sample line" flag is not true, then the compute utilization state will continue computing the utilization in accordance with the registers set within control register block 252 of FIG. 4A. As can be appreciated, condition 552 is analogous to a triggering effect which is used to clear the registers and begin recalculating utilization parameters.

Figure 6:
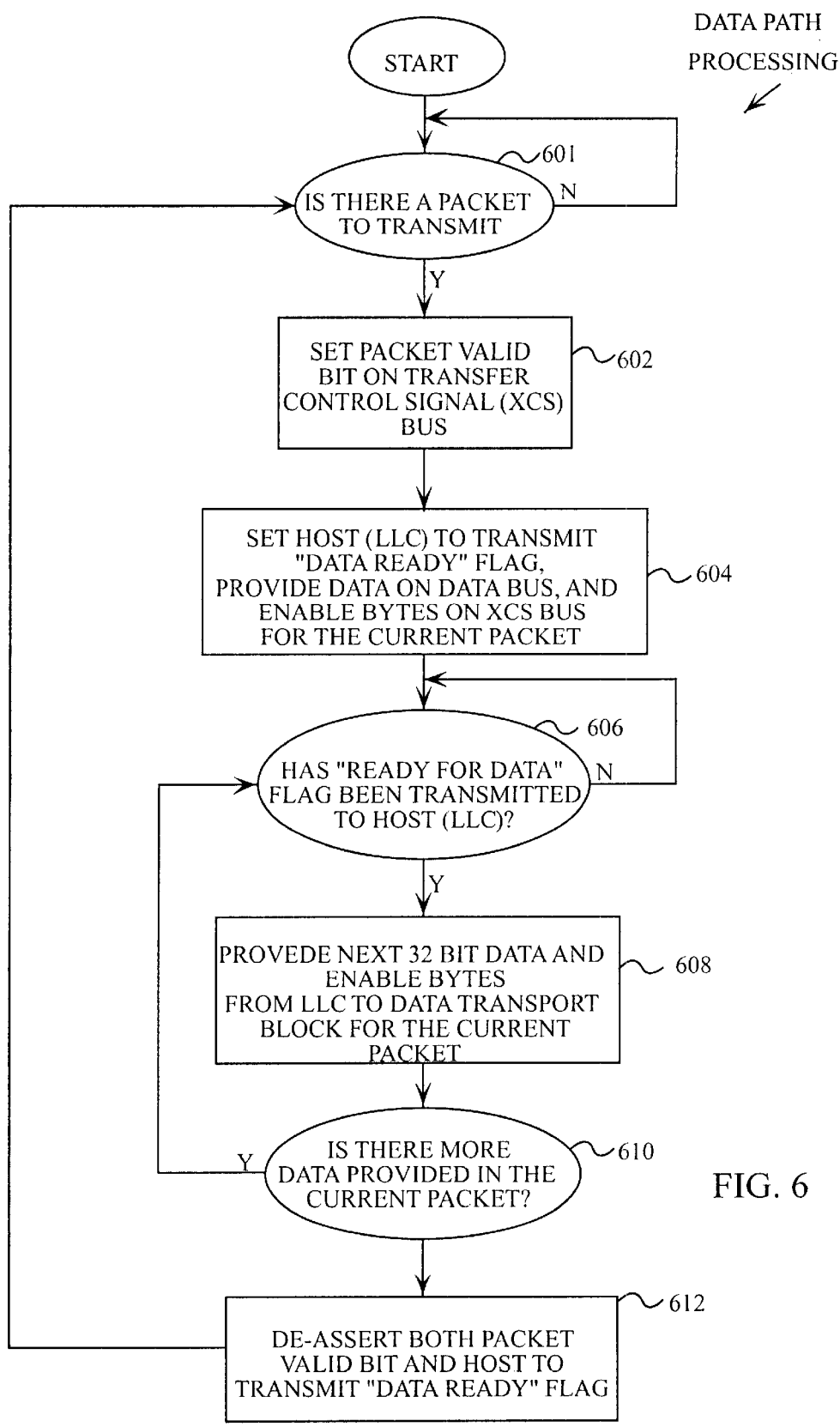
FIG. 6 is a flowchart diagram illustrating the method steps associated with processing data through a data path in accordance with one embodiment of the present invention.

FIG. 6 is a flowchart diagram illustrating the process steps associated with processing data through a data path in accordance with one embodiment of the present invention. The method begins at a step 601 where it is determined whether there is a packet to transmit. If there is no packet to transmit, the method will wait until there is a packet to transmit. When there is packet to transmit, the method will proceed to a step 602 where a set packet valid bit of transfer control signal (XCS) bus is passed to data transfer block 250 indicating that there is data to transfer on the LLC data path which is 32 bits wide. Once the packet valid bit is set on the transfer control XCS bus in step 602, the method will proceed to a step 604. In step 604, the host is set to transmit a "data ready" flag and provide data on the data bus for a current packet.

In this embodiment, the host may be viewed as the upper LLC layer that communicates with the media access controller (MAC) layer. Once the host is set to transmit the "data ready" flag and the data is provided on the data (i.e., first 32 bits) bus for the current packet, the method proceeds to a decision step 606 where it is determined whether a "ready-for-data" flag has been transmitted from the flow based MAC 150 (of FIG. 2) to the host (LLC). If this flag has not been transmitted, this indicates that the flow based MAC 150 is not ready to receive data from the LLC layer. At this point, the method will wait until the flow based MAC 150 is ready to receive data by setting the appropriate "ready-for-data" flag that is transmitted to the host (LLC).

Once data-for-ready flag has been set in step 606, the method will proceed to a step 608 where the next 32 bits of data of the current packet are provided from the LLC to the data transport block 250 of FIG. 4. As described in FIG. 4A, the data transfer block 250 receives the data from the LLC through a 32-bit wide path. However, it should be understood that any suitable data path width may be implemented without departing from the spirit and scope of the present invention.

The method now proceeds to a decision step 610 where it is determined whether there is more data provided in the current packet. By way of example, if there are more 32-bit wide words to be transmitted for the current packet, the method will revert back to decision step 606 where it is determined whether a ready-for-data flag has been transmitted to the host LLC for the next 32-bit data from the LLC. If it is determined that ready-for-data flag has been transmitted to the host in step 606, the method will again proceed to step 608 and 610, and again back to step 606 until all of the data has been transmitted for the current packet.

Once it is determined in step 610 that there is no more data provided for the current packet, the method will proceed to a step 612 where both the packet valid bit and the host to transmit "data ready" flag are de-asserted indicating that there is no more data to be transmitted for the current packet. Of course, once the method returns back to step 601, it is once again determined whether there are more packets to transmit. Accordingly, if there are more packets to transmit, then the method will again proceed from step 602 through step 612 until all bytes of data are transmitted for the next packet.

Figure 7:
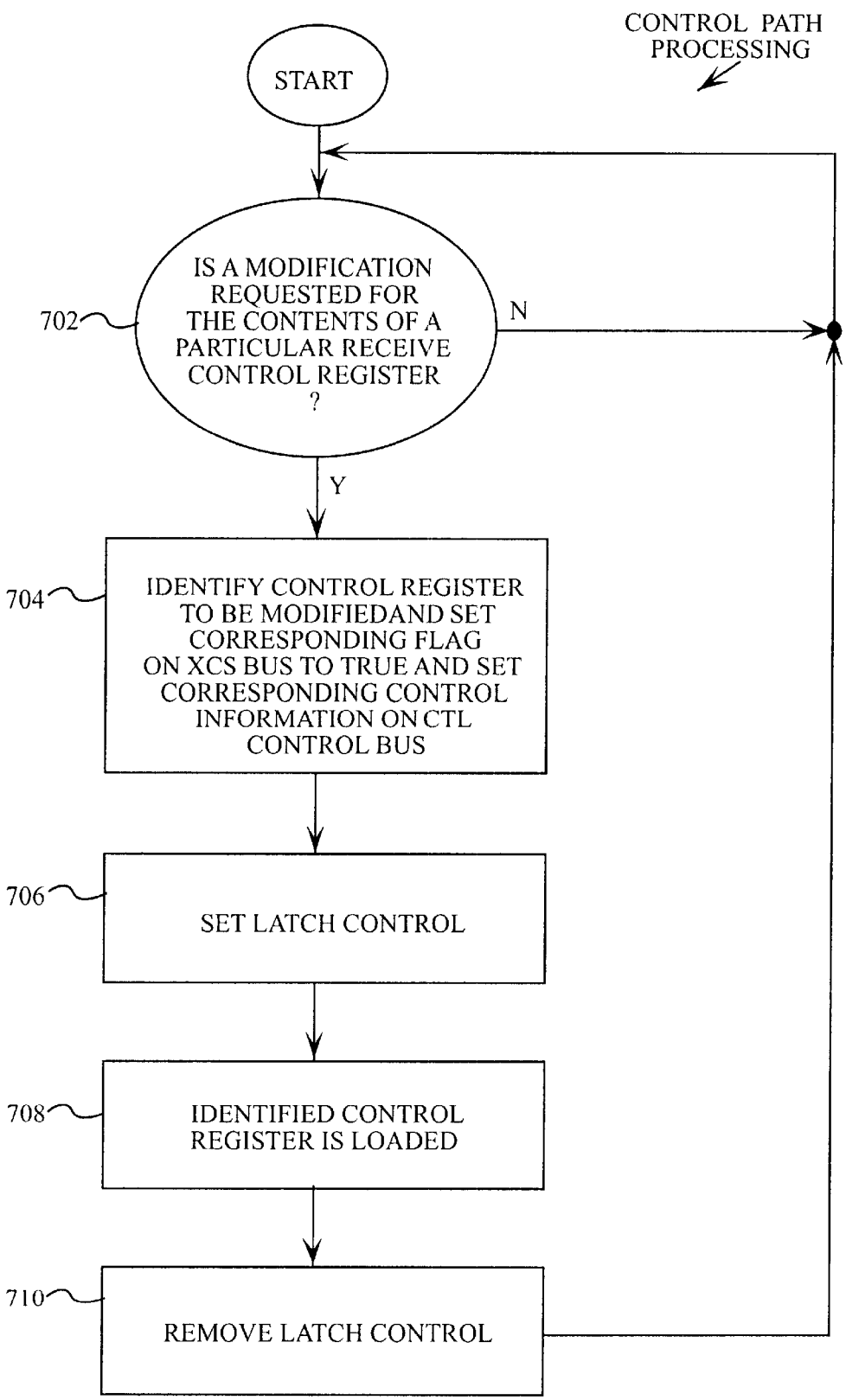
FIG. 7 shows a flowchart diagram illustrating the method steps associated with control path processing in accordance with one embodiment of the present invention.

FIG. 7 shows a flowchart diagram illustrating the method steps associated with control path processing in accordance with one embodiment of the present invention. Control path processing starts at a step 602 where it is determined whether a modification request for the contents of a particular control register is requested. If it is determined that no modification is required for a particular control register, the control path processing will not commence (i.e., data processing will proceed without any modifications) and the process will again revert to decision step 702 where it is again determined whether a modification is requested for the contents of a particular control register.

By way of example, FIG. 4B illustrates a set of six control registers that may be selected for modifying the processing of a particular packet as it is transferred down the data path as described in FIG. 6. Accordingly, if the user desires to reset one of the various registers in control register block 252, a control signal is passed into control register block 252 through control bus 253 as shown in FIG. 4A. Once a particular register is selected, the contents of the registers are either modified by writing in a particular value to modify DEFER period register 304, slot time register 306, retry limit register 308, or programmable min/max packet size register.

On the other hand, if command protocol register 302 is selected, various flags within command protocol register 302 may be selected. As shown in FIG. 4C, there are a variety of flags that may be triggered based on the type of control information fed into control register block 252 as shown in FIG. 4A. By way of example, the user may want to process in full duplex mode by selecting fdplx 322 flag, or for example, the user may want to disable CRC by selecting no CRC 326 flag. Of course, any of the other suitable registers flag or register may selected depending on the type of processing protocols desired by the user.

It is important to note that control path processing described in FIG. 7 is a separate process that may be run in parallel with the data processing being performed in FIG. 6. As a result, data being processed through data path processing of FIG. 6 may be modified at any point during the data processing path irrespective of when control is passed, since control may be passed in parallel as shown in FIG. 7. Thus, if it is determined in step 702 that a modification request for the contents of a particular control register is desired, the method will proceed to a step 704 where the particular control register to be modified is identified and the corresponding flag is set on the XCS bus to be true. Once the corresponding flag is set to true, the corresponding control information is also set on the control bus. As an example, if no preamble flag is set in command protocol register 302 of FIG. 4C, the packet being transmitted in parallel as described in FIG. 6, will no longer have a corresponding preamble appended to the beginning of the packet.

The method now proceeds to a step 706 where a latch control is set by the LLC that drives the XCS bus. Once the latch control is set in 706, the method proceeds to a step 708 where the identified control register is loaded for the particular packet being processed. Once the identified control register is loaded in step 708, the method proceeds to a step 710 where the latch control is removed. Once the latch control is removed in step 710, the method will proceed back to step 702 where it is again determined whether a modification for the contents of a particular control register is desired. If it is, the method will again proceed through steps 704 to 710.

Figure 8A:
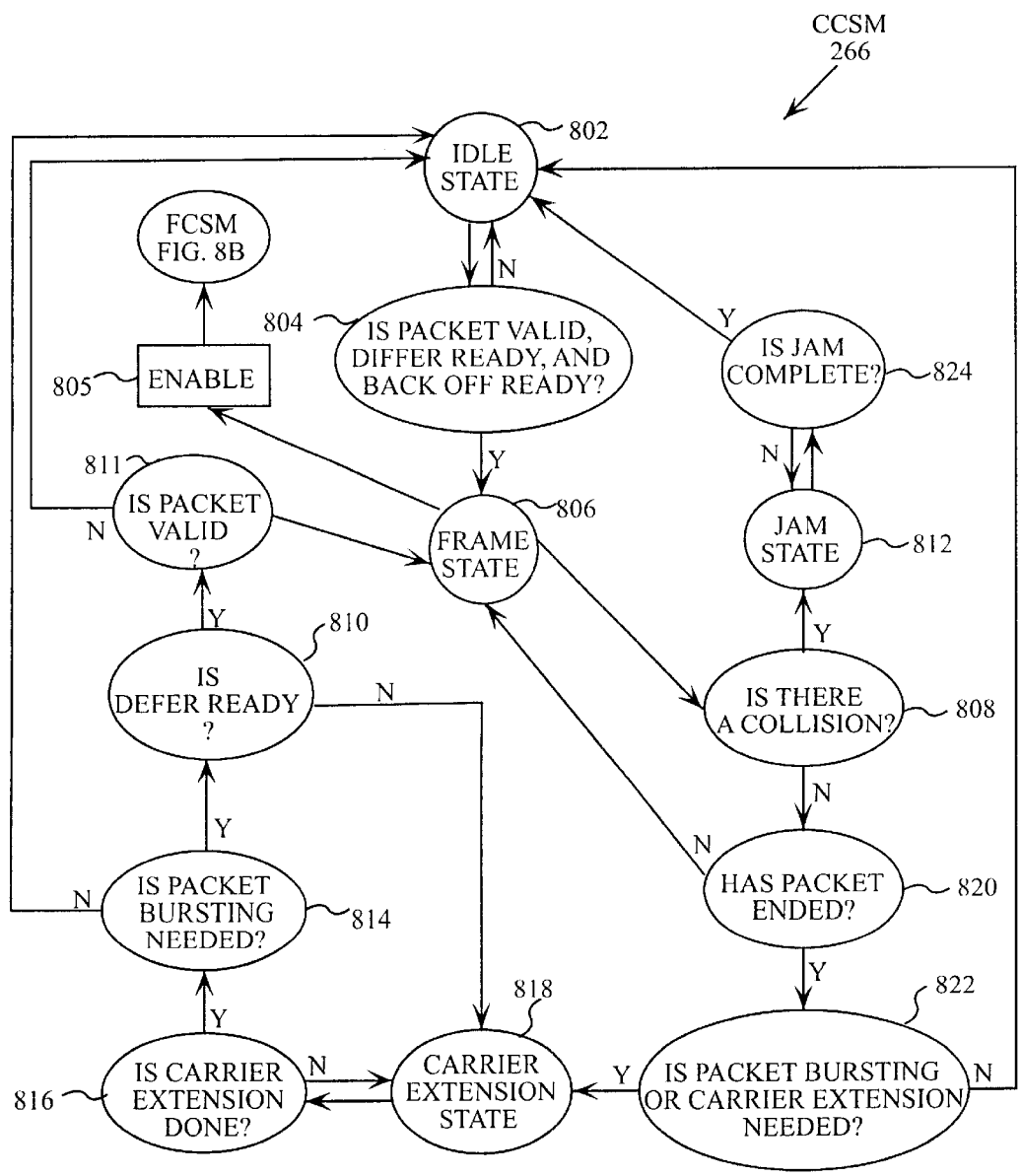
FIG. 8A is a carrier control state machine (CCSM) that may be contained within an ETHER processing block in accordance with one embodiment of the present invention.

FIG. 8A is a carrier control state machine (CCSM) 266 that may be contained within ETHER block 212 in accordance with one embodiment of the present invention. In this embodiment, the state begins at an idle state 802 when no transmission is being performed by SUPERMAC Tx controller 118 of FIG. 3. When it is determined at a condition 804 that a packet valid signal, a defer ready signal and a backoff ready signal is received, the state will move to a frame state 806 where actual packet data transmissions are processed. While in frame state 806, CCSM is constantly determining in a condition 808 whether a collision occurs during the transmission of packets.

By way of example, if a collision is detected at a condition 808 (e.g., which indicates that another station is attempting to transmit while a packet is being transmitted),the state machine will go to a jam state 812 where a jamming signal is sent out over the network and any current transmission ceases. The jamming signal also assures that all other stations on the network also detect a collision and likewise cease their transmission. Once the other stations receive the jamming signal and cease transmitting, all transmitting stations will wait for a predetermined back off period which is an arbitrary number of "slot times" that are calculated using the aforementioned truncated binary exponential backoff algorithm.

While in the jam state 812, it is constantly being determined in condition 824 whether jamming is complete. If jamming is not complete, the jam state will continue jamming until the jam state 812 is complete. Once it is determined that jamming is complete in condition 824, the state will return to an idle state 802.

Referring again to condition 808, if it is determined that there are no collisions in condition 808, the state will proceed to another condition 820 where it is determined whether the packet has ended. If the packet has not ended, the state will revert back to frame state 806. On the other hand, if the packet has ended in condition 820, the state will revert to another condition 822 where it is determined whether packet bursting or carrier extension is needed. As described above, if carrier extension is required, the transmitted packet will preferably be at least 512 bytes long. In general, a packet is part of a carrier event and during each packet transfer, a carrier event period of 512 bytes must laps before a new packet is transmitted. Therefore, if a packet contains less than 512 bytes of data, the rest of the bytes up to 512 will generally include carrier extension symbols.

If it is determined in condition 822 that packet bursting or carrier extension is needed, the state will proceed to a carrier extension state 818 where appropriate carrier extension processing is performed as described above. While in the carrier extension state, it is determined in condition 816 whether carrier extension is done. If carrier extension is not done, carrier extension state 818 will be maintained. Once carrier extension is done, it will be determined in condition 814 whether packet bursting is needed (i.e., more packets follow). If packet bursting is needed in condition 814, the state will proceed to a condition 810. In condition 810, it is determined whether a defer ready condition is met for the new packet. If defer is not ready, the state is maintained at carrier extension state 818 where it remains until it is determined in condition 816 that carrier extension is done. On the other hand, if defer is ready in condition 810, the state machine will determine whether a packet valid condition is met in condition 811.

Figure 8B:
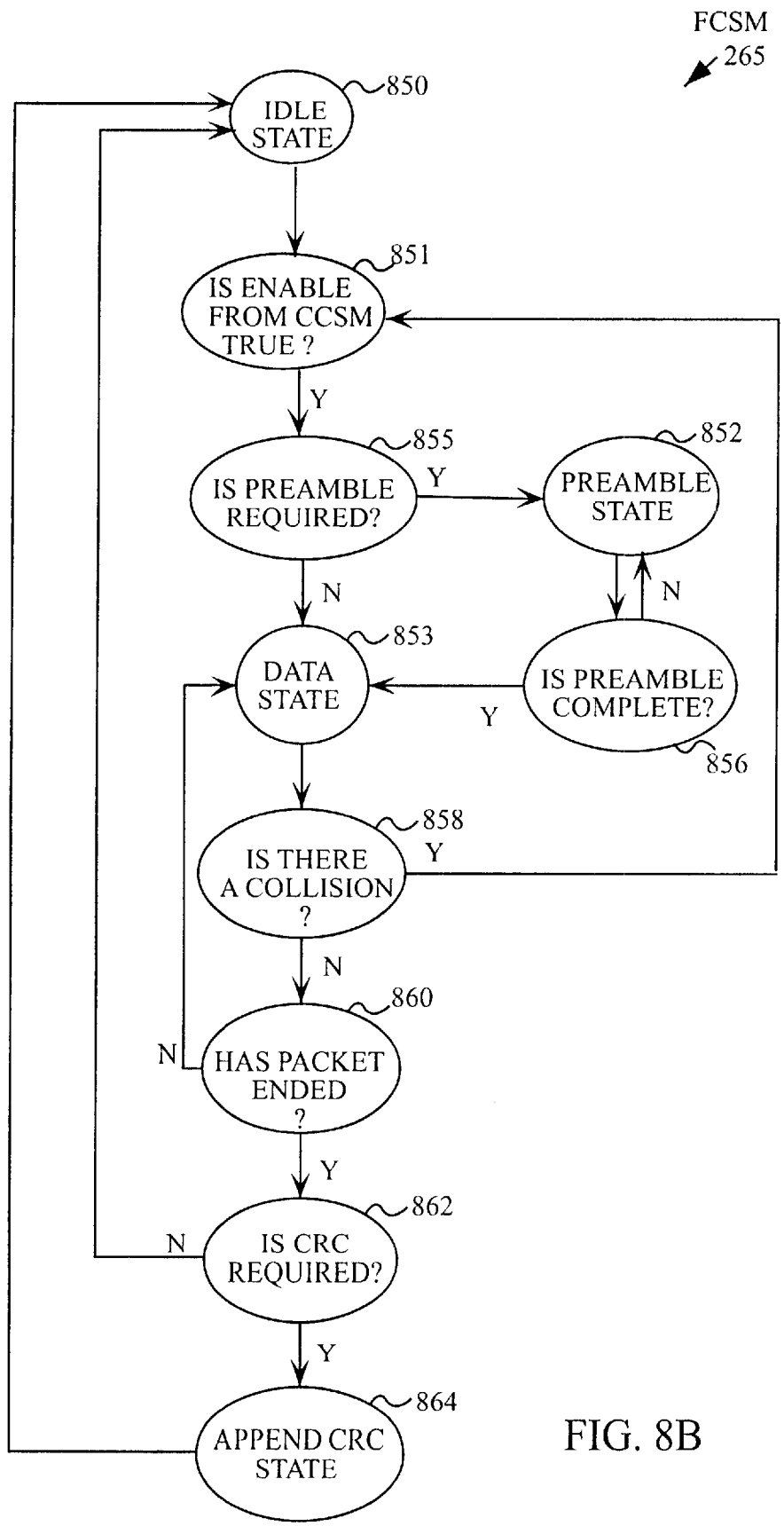
FIG. 8B is a frame control state machine (FCSM) that may be contained within an ETHER processing block in accordance with one embodiment of the present invention.

If condition 811 is met, the state will revert to state frame 806 as described above. On the other hand, if the packet valid condition 811 is not met, the state machine will revert to idle state 802. It should be understood that while in full duplex mode, no carrier sensing nor collision detection will preferably be performed in state 808. Once an enable flag is set in a step 805, a frame control state machine (FCSM) of FIG. 8B is initiated. Although the CCSM and FCSM state machines are being described as separate state machines, it should be understood that each of the two state machines may operate as one large state machine. In addition, it is important to note that many of the operations performed in CCSM and FCSM are preferably performed in parallel.

FIG. 8B begins at a condition 850 where the frame control state machine is in an idle state 850 in accordance with one embodiment of the present invention. From condition 850, the state machine moves to a condition 851 where a determination is made as to whether "enable" is true from the CCSM state machine of FIG. 8A. Once it is determined in condition 851 that enable is true, the state machine will move to a condition 855 where it is determined whether a preamble required. By way of example, as shown in FIG. 4C, no preamble 328 flag may be appropriately set for each packet being processed within flow control MAC 150. If a preamble is required, an appropriate preamble is generated and appended to the packet being processed. As described above, preamble generally includes synchronization information as well as a start frame delimiter indicating the beginning of a frame.

While at preamble state 852, it is determined in condition 856 whether preamble appending is complete in preamble state 852. If it is not complete, then preamble state 854 will continue. Once the appropriate preamble has been appended in state 852, the state will move to a data state 853 where data is being transmitted through the appropriate data path. While in data state 852, it is continually determined in condition 858 whether there are collisions. As described above, a collision may occur if any other station attempts to transmit while the current station is transmitting. If it is determined that a collision occurred, then the state will return to idle state 851 and remain at idle waiting for a new "enable" from CCSM of FIG. 8A.

On the other hand, if it is determined in condition 858 that there is no collision, then it is determined in a condition 860 whether the packet has ended transmitting. Of course, if the packet requires padding, auto padding will also be performed in data state 852 which therefore, is part of the packet that is being transmitted. In this embodiment, the packet being transmitted at data state 853 does not yet include CRC. If it is determined in condition 860 that the packet has not ended its transmission, then the state will return back data state 853 where data will continue transmitting until complete. When it is determined that the packet has ended transmitting and condition 860, it is further determined whether CRC is required in condition 862.

By way of example, as shown in FIG. 4C, if no CRC 326 flag was set to true, then no CRC would be appended to the end of the appropriate packet being transmitted. If the CRC flag is not set to true in condition 862, then the state will return to idle which indicates that the entire packet has been transmitted without CRC. On the other hand, if the CRC flag is not set to true, then CRC will be appended to the packet being transmitted and the state will proceed to an append CRC state 864 where the current packet being transmitted is provided with appropriate CRC information.

Accordingly, frame control state machine (FCSM) 265 has now appropriately transmitted data having either no preamble, no CRC, and detected any collisions. Of course, if the full duplex 322 flag of FIG. 4C was set to true, then condition 858 would not be determined and no collision detection would be attempted.

2. RECEIVER SIDE

The receiving side of the flow based MAC 150 of FIG. 2 will now be described in accordance with one embodiment of the present invention. As shown, the receiving side of FIG. 2 generally receives a signal from physical medium 141 that is input into SUPERMAC Rx controller 120.

Accordingly, the following discussion will illustrate the operational blocks contained within SUPERMAC Rx controller 120.

Figure 9:
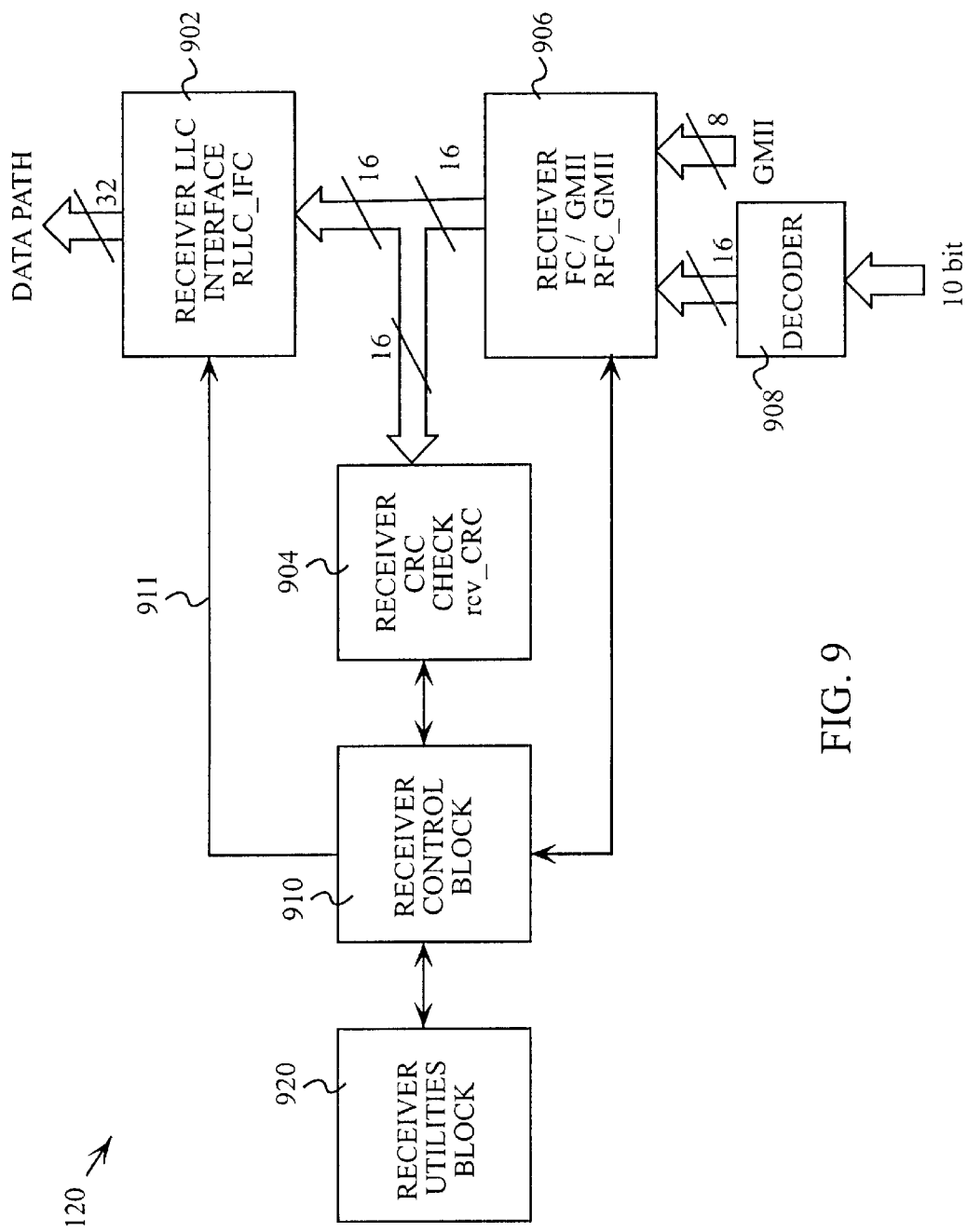
FIG. 9 illustrates a functional block diagram that may be contained within a receiver SUPERMAC Rx controller in accordance with one embodiment of the present invention.

FIG. 9 illustrates a functional block diagram that may be contained within a receiver SUPERMAC Rx controller 120 in accordance with one embodiment of the present invention. As shown, there is a main data path that enters into a receiver from a fiber channel or a gigabit medium independent interface (GMII) 906. Although any physical medium may be connected to receiver FC/GMII 906, a fiber channel decoder 908 generally receives a 10-bit signal that is decoded in accordance with well known Fiber Cannel standards. Once decoded, a 16-bit wide data path is output to receiver FC/GMII 906.

Also shown is a GMII 8-bits wide input that is fed into receiver FC/GMII 906. As described above, a suitable GMII interface is generally capable of reading standard electrical and mechanical signals received from various types of physical layer devices. Once receiver FC/GMII 906 receives and converts the appropriate signals into a suitable 16-bit wide data path, the data is transferred to a receiver CRC check 904 where a CRC check is performed on the received packet to determine whether an error occurred during transmission. As described with reference to the transmission side, when a packet is transmitted, CRC is generated and appended as a 4-byte CRC field at the end of the packet. Accordingly, at the receiving side, the receiver CRC check 904 performs the same CRC calculation to determine whether an error occurred during transmission.

Generally, if the CRC check output at block 904 is different than that appended at the transmitting side, an error is typically assumed to have occurred during transmission. At the same time CRC checks are performed, the data is transferred to receiver LLC interface 902 where appropriate processing is performed on the received packet. By way of example, pad stripping, start sample line, self receive and receive enable operations may be performed on the received packets based on appropriate flag set in a receiver controller register as will be described in greater detail with reference to FIGS. 9A and 9B below.

Once the receiver LLC interface 902 has performed appropriate processing on the received packet, a 32-bit data is output to the LLC upper layer. Generally speaking, receiver LLC interface 902 performs suitable processing on the received packets based on the states of the receiver control block 910. In this embodiment, receiver control block 910 is preferably a state machine capable of controlling the appropriate processing operations performed within SUPERMAC Rx controller 120. Also shown is a receiver utilities block 920 that is preferably suited for maintaining receiver statistics. In one embodiment, typical receiver statistics signals are illustrated in Table 4 below.

TABLE 4

| rcv2hst_stat | |
|---|---|
| rcvEnabled | Receiver is active (enabled) |
| rcvError | Reception was with error |
| errorCRC | There was CRC error |
| errorLong | The packet was too long (>1518 bytes); of course, standard packet sizes are programmable in accordance with one embodiment of the present invention. |
| errorShort | The packet was shorter than 64 bytes; however, this is programmable. |
| errorFrame | Framing error detected (RXER) |
| errorOverFlow | Buffer overflowed |
| errorCRE | Carrier event was too long |

TABLE 4-continued

| rcv2hst_stat | |
|---|---|
| errorProtocol | New packet came in before first packet completed 512 bytes. (Giga bit only). |
| macControl | The packet is a MAC control packet |
| pkt8023 | The packet is a 802.3 packet |
| receiveIPG | Value of received IPG |
| octsCnt | Value of octet counter |
| ctrOflow | The counter (for IPG or byte counter) overflowed |
| Utilization factor | Value of utilization factor |

FIG. 9A is a more detailed block diagram of receiver LLC interface 902 of FIG. 9 in accordance with one embodiment of the present invention. As shown, a data transfer block 950 receives a 16-bit wide data from receiver FC/GMII 906 of FIG. 9. Based on the state of the registers contained within receiver control register 952, and the appropriate latching time controlled by a receiver local control logic 954, the SUPERMAC Rx controller 120 will perform the desired processing.

By way of example, once control bus 953 passes an appropriate control (CTL) command and a latching control is received from transfer control signal bus (XCS), a selected processing control will be transferred from receiver control register 952 to selected processing blocks. In this embodiment, the appropriate control information is passed to receiver control block 910, receiver FC/GMII 906, receiver utilities block 920 (of FIG. 9), and receiver control logic 954 (of FIG. 9A).

Next, the receiver control logic 954 will preferably communicate to receiver control block (e.g., state machine) 910 and receiver FC/GMII 906. In one embodiment, CRC may either be stripped within receiver LLC interface 902, or may be passed through to micro-RISC stream processor 114*a* of FIG. 2 where stripping is performed. In addition, if padding was appended to the data field during transmission, the padding may also be passed through to the micro-RISC stream processor 114*a* when a byte enable is not provided. In this manner, padding information may be passed to the micro-RISC stream processor 114*a* for special inventive processing.

Advantageously, passing padding information to LLC allows the inclusion of proprietary information within the pad field. In a further embodiment, passing the padding field provides additional bandwidth for including management information which may be used to identify particular frames of interest within a stream of frames. In yet a further embodiment, if the padding is passed, the pad may also include time stamp information that may be used to determine network latencies. As described above, these latencies may be defined as the length of time it takes a packet of information to be transmitted on a network and then returned back to the transmitting station. Of course, padding may only be required for packets having less than 64bytes of data. On the other hand, if the minimum packet size is programmably increased above 64bytes, more packets will require padding.

FIG. 9B illustrates the flags contained within a receiver control register 952 in accordance with one embodiment of the present invention. The first flag is a receive enable 990 flag which indicates that SUPERMAC Rx controller 120 is ready to receive data. In this embodiment, enable 990 flag may be used by receiver control logic 954 and data transfer block 950 for initiating the receive protocol. The next flag is a strip padding 992 flag that is used to set pad stripping operations. In general, any required pad stripping is performed at the receiver control block 910 state machine which will be described in greater detail below.

The next flag is a start sampling line 994 flag which is used to trigger sampling on the receive side. By way of example, when start sample line 994 is triggered, the utilization counters are essentially refreshed and the receiver's utilization is once again accounted for from scratch. The last flag is a self-receive 996 flag that is used to enable receiving data that may be transmitted by the transmitter when diagnostic operations are performed. Of course, if operation is in half duplex and the medium is MII active, the signal will normally be returned automatically. Although only specific flags have been identified, it should be understood that any number of suitable flags or additional registers may be included depending on a user's requirements.

FIG. 9C shows a more detailed block diagram of the structure contained within receiver FC/GMII 906 of FIG. 9 in accordance with one embodiment of the present invention. In this embodiment, a first input may be provided in a 16-bit wide data path into fiber channel (FC-1) 962 from decoder 908, and second (GMII) 8-bit wide signal may be input into a gigabit media independent interface processing block 963. It should be understood that blocks 962 and 963 are independent processing blocks. As an example, other interfaces such as a downward compatible 100/10 Mbps MII interface unit may also be implemented.

Also shown is a common control data path which combines the control and data information received from both fiber channel 962 and GMII 963 into a multiplexed signal that is 16-bits wide. Once the data and control information is multiplexed in block 961, the flow proceeds to receiver CRC check 904 and receiver LLC interface 902 as described above. Of course, if only a single signal is received from the physical layer, the receiver FC/GMII is also capable of receiving one signal at a time without performing a multiplexing operation.

FIG. 9D is a block diagram that illustrates in greater detail the functional blocks contained within receive utilities block 920 (of FIG. 9) in accordance with one embodiment of the present invention. As shown, a support logic block 980 is preferably used for supporting functions performed within receive control block 210. In middle block 982, an inter packet gap (IPG) and octet counter is used for keeping tack of IPG for received packets, and identify the number of bytes received per packet respectively. For an exemplary list of parameters maintained within receive utilities block 920, a table 5 identifying suitable statistics retrieved through response bus "rcv2hst_rsp" are shown below. In a further embodiment, parts of response bus "rcv2hst_rsp" may also be driven by other modules.

TABLE 5

| rcv2hst_rsp | | |
|---|---|---|
| rcvClk | | Useful to register the status information |
| rcvDone | | Packet received and packet Status bits are valid |
| pktValid | | Receiver is actively receiving packet (excluding preamble) |
| idleValid | | The requested direct data from decoder output or GMII is valid |
| byteEnable | | Corresponding bytes are valid on rcv2hst_data bus |
| fcKgen | | The KFLAGs as received from FC-1 port or RX_DV, RX_ER as received on GMII port |
| padValid | | Now PAD data is going on data bus |
| ipgValid | | IPG information is valid on status bus |
| octsValid | | byte count is valid on status bus |
| utilValid | (00) | Counter working |
| | (01) | It underflowed |
| | (10) | It overflowed |

Still referring to FIG. 9D, a cascadable utilization computer 984 is used to calculate receiver utilization using circuitry that may be increased in a cascadable manner based on a desired "minimum number of CPU interrupts." As described above, once the minimum number of CPU interrupts desired is identified, the utilization computer circuitry may be cascaded (i.e., replicated and integrated for increased processing power) to meet desired processing requirements. Accordingly, the amount of hardware circuitry may be adjusted depending on a user's performance needs.

Figure 10:
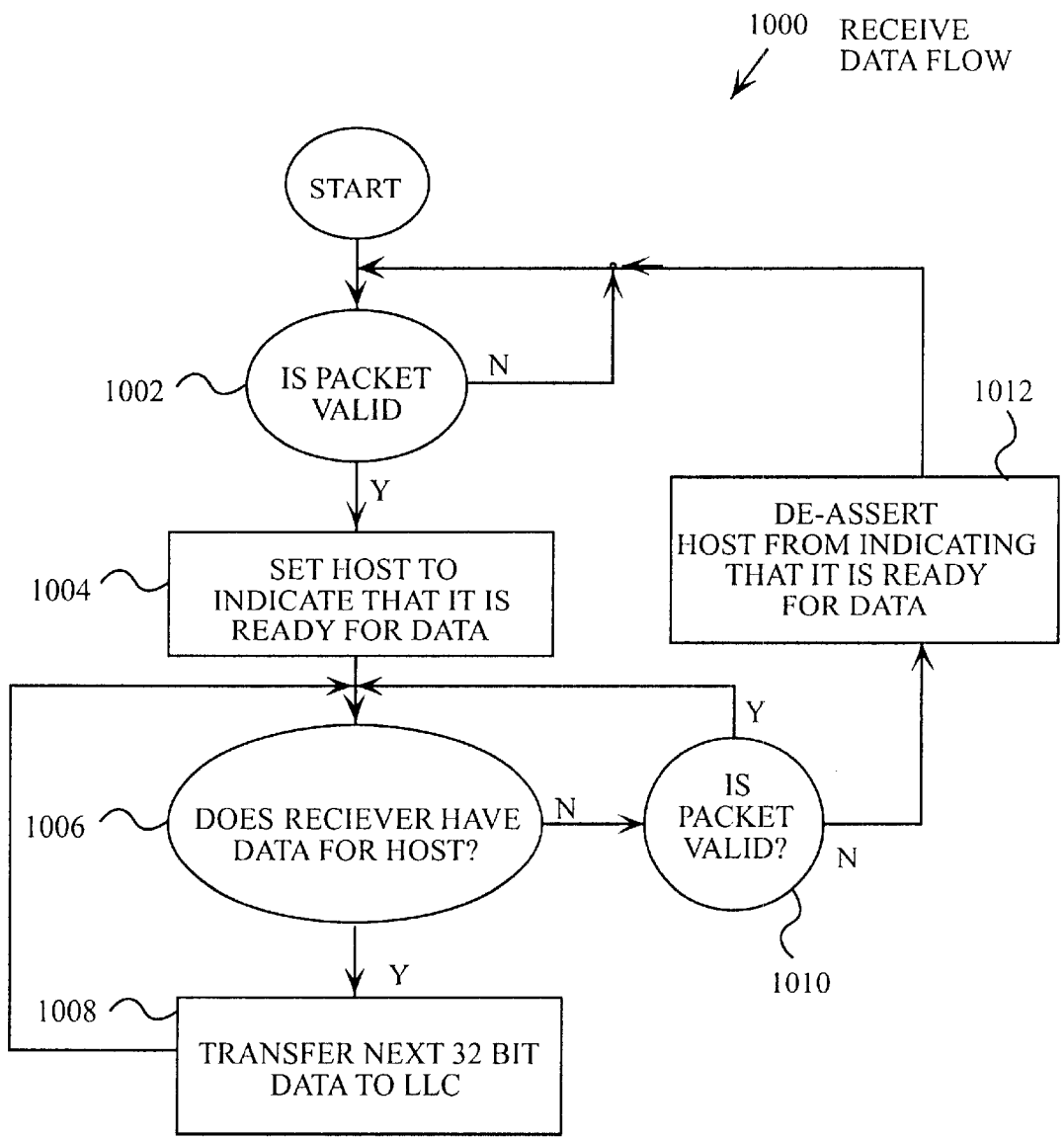
FIG. 10 is a flowchart diagram illustrating the data flow at the receiving side of the flow based MAC in accordance with one embodiment of the present invention.

FIG. 10 is a flowchart diagram 1000 of the data flow at the receiving side of the LLC in accordance with one embodiment of the present invention. It should be appreciated that data and control information is processed in a parallel manner as described above. The data path flow method begins at a step 1002 where it is determined whether a packet valid signal is true. If a packet valid signal is not true, then the method will wait until a packet valid signal has been passed to appropriately indicate that the receiver is ready with a packet. When packet valid signal is true, the method will proceed to a step 1004 where the host is set to indicate that it is ready for data.

In this embodiment, the host should be understood to be the upper LLC layer that is receiving the data from the flow based MAC 150 of FIG. 2. When the host indicates that it is ready for data in step 1004, the method will proceed to a decision step 1006 where it is determined whether the receiver has data for the host. By way of example, at this step, it is determined whether the flow based MAC 150 has data that it desires to transfer to the LLC layer. If it is determined that the receiver does not have data to transfer to the LLC layer, then the method will proceed to a decision step 1010 where it is determined whether there is a packet valid.

If a packet valid signal is present, then the method will return back to decision step 1006 where it is again determined whether the receiver has data for the host. When the receiver does have data for the host, then the method will proceed to a step 1008 where the data (e.g., next 32 bits) contained within the receiver is transferred to the LLC layer. On the other hand, if it is determined in decision step 1010 that the packet valid signal is not present, then the method will return to a step 1012 where the host (LLC) is de-asserted from indicating that it is ready for data.

At this point, the method will return back to decision step 1002 where it is again determined whether a packet valid signal has been established. At this point, the method may continue to flow transferring data from steps 1002 through steps 1010 until all the requested data has been transferred.

Figure 11:
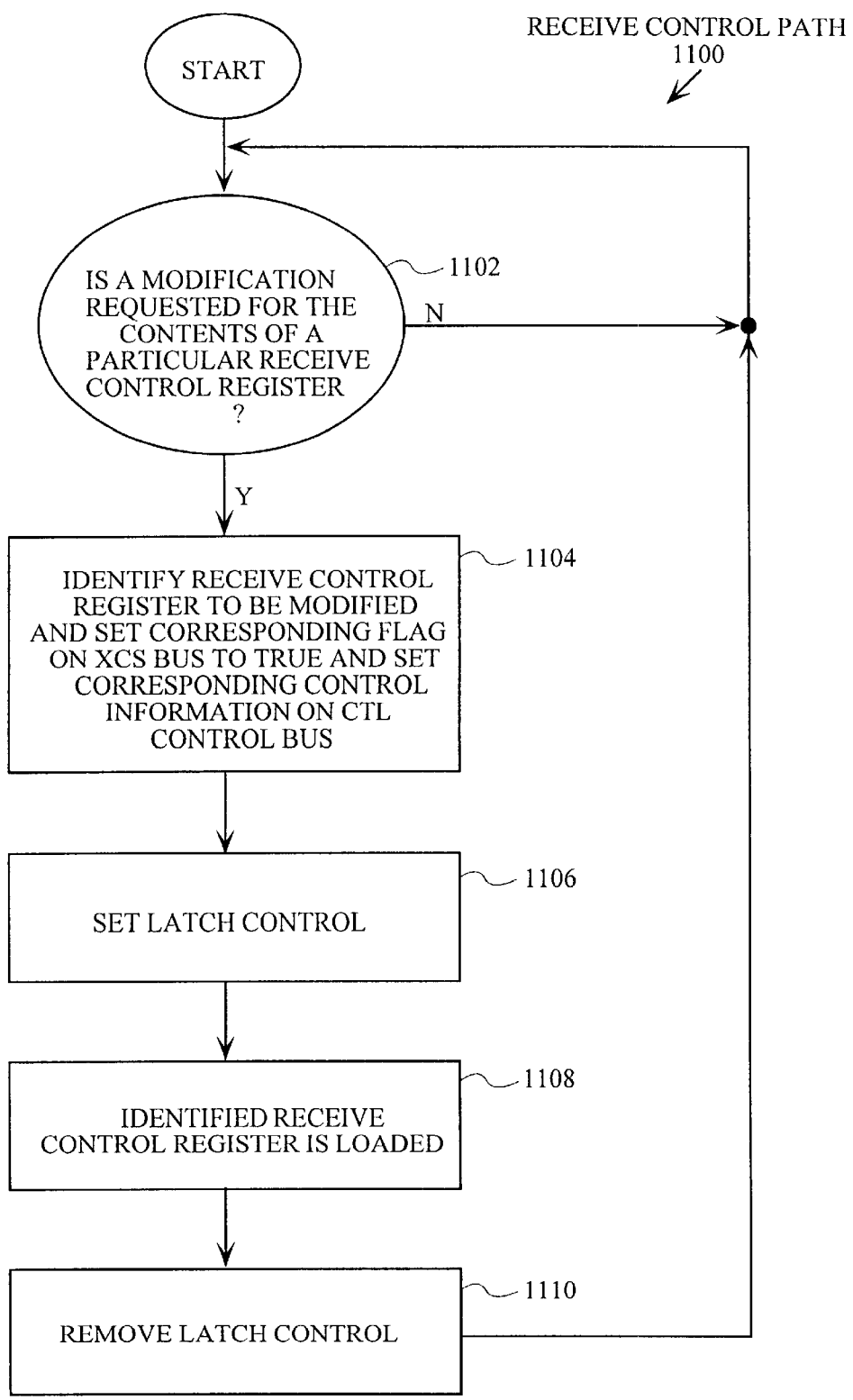
FIG. 11 is a flowchart diagram illustrating the method steps associated with passing control in parallel with data processing in accordance with one embodiment of the present invention.

FIG. 11 is a flowchart diagram 1100 illustrating the method steps associated with passing control in parallel with a data path in accordance with one embodiment of the present invention. In this embodiment, the method steps associated with the modification of process control parameters in the receiving portion of the MAC flow controller 150 of FIG. 2 are described. The method begins at a decision step 1102 where it is determined whether a modification request for the counters of a particular receive contents register is desired.

By way of example, the receive control registers may be registers contained within receiver control register block 952 as described above. Therefore, appropriate flags may be contained within a register that may be contained within receiver control register block 952. That is, if the user desires to enable strip padding flag 992, then appropriate control signals may be transmitted to receive control register 952 by control bus 953 of FIG. 9A, and a transfer control signal (XCS) will indicate a latching time for that selection.

Once a modification is requested in step 1102, the method will proceed to a step 1104 where the appropriate receive control register is identified and the corresponding flag is set on the XCS bus to be true. In addition, once the flag is set on the XCS bus, the corresponding control information is placed on the CTL 953 control bus. The method then proceeds to a step 1106 where latch control is set for the appropriate flag. Once latch control is set for the appropriate flag in step 1106, the method proceeds to a step 1108 where the identified receive control register is loaded for appropriate processing through the receive LLC interface 902 of FIG. 9. Once the appropriate control register is loaded in step 1108, the method proceeds to a step 1110 where the latch control is removed. It is important to note that receive control path 1100 may be processed in parallel with data being transferred through receive data flow path 1000 of FIG. 10.

Figure 12:
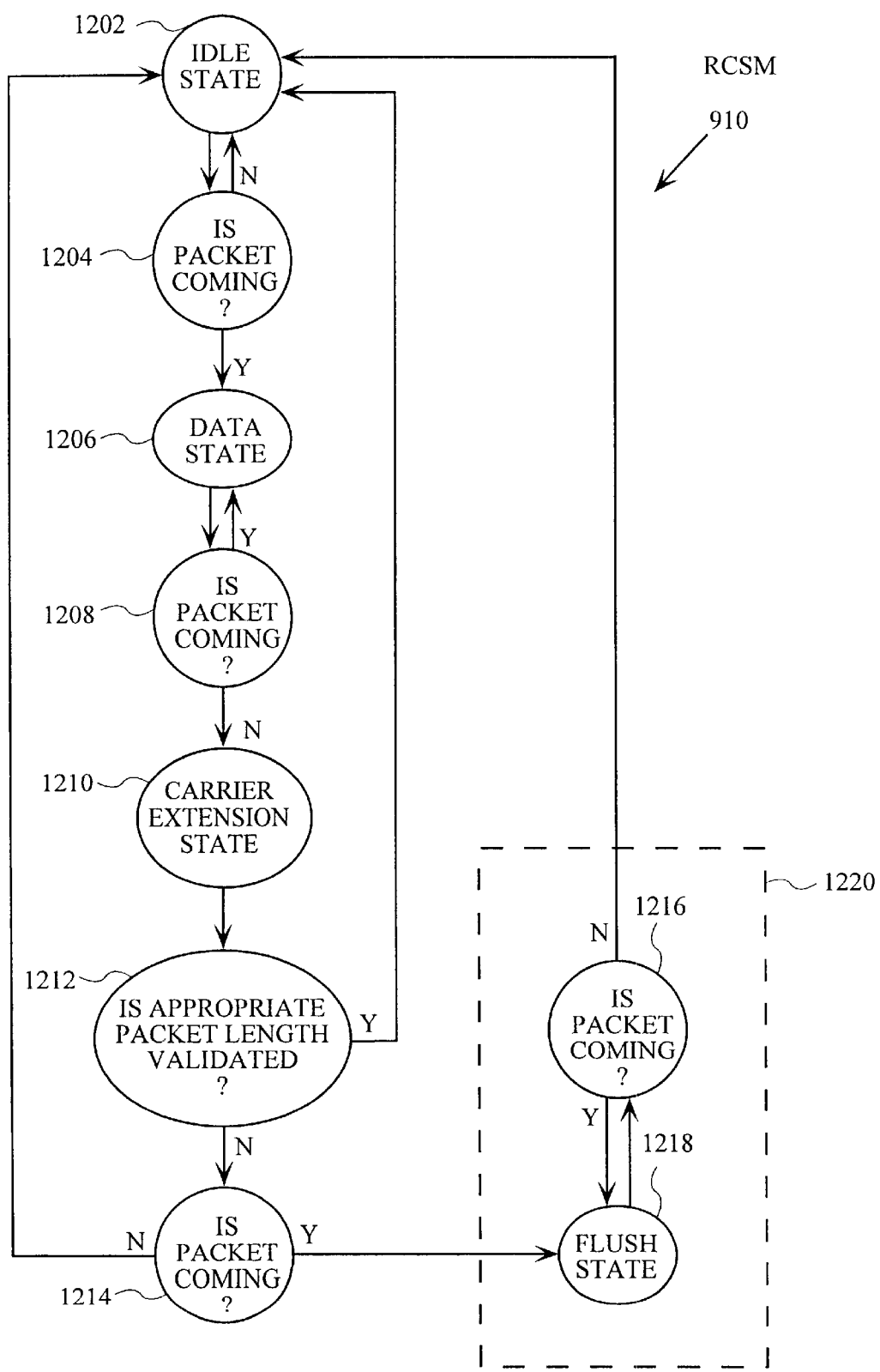
FIG. 12 is a state machine diagram for carrying out the processing of the receiver control block of FIG. 9 in accordance with one embodiment of the present invention.

FIG. 12 is a state machine diagram for receiver control block 910 of FIG. 9 in accordance with one embodiment of the present invention. Initially, the state machine is in an idle state and remains inactive until it is determined that a packet is coming from the physical medium (e.g., physical medium 141 of FIG. 2). By way of example, in condition 1204, if it is determined that a packet is coming, then the state machine will go to a data state 1206 where the current packet is processed through the receiver FC/GMII 906 and receiver LLC interface 902 of FIG. 9.

While in data state 1206, it is also determined in condition 1208 whether a packet is continuing, and if a packet is coming, the state machine will remain at data state 1206 where the received packet is processed through SUPERMAC Rx controller 120. However, if it is determined in condition 1208 that no packet is coming, then the state machine will go to a carrier extension state 1210 where an appropriate carrier extension is processed. In this embodiment, the current packet will remain at carrier extension state 1210 until it is determined in condition 1212 that the appropriate packet length has been validated. A packet is said to be validated if the total size including carrier extension is at least 512bytes (e.g., when in carrier extension mode) in length. Once it is determined that the packet length has been validated, the state will return to the idle state 1202 indicating that the current packet was correctly processed through the receiver.

On the other hand, if it is determined in condition 1212 that the appropriate packet length has not been validated, and it is determined in condition 1214 that a packet is coming, then the state machine will go to a flush state 1218 where the un-validated packet as well as the packet that was coming are flushed (i.e., two packets are flushed). If no packet is coming, then the state will return to idle state 1202.

When the state machine is at carrier extension state 1212, it is again determined in condition 1214 whether a packet is coming. For example, assume a first packet is in the process of being validated in state 1210, and a second packet arrives (i.e., condition 1214 is true) before the first packet is validated. When this occurs, the state machine will go to flush state 1218 where both the first and the second packet are also flushed. In other words, the first packet as well as the second packet that arrived while the first packet was being validated are both flushed in flush state 1218. In addition, if a packet any other packets are coming as determined in a condition 1216 while the state machine is in flush state 1218, those packets area also flushed. Accordingly, a processing unit 1220 generally prevents the reception of un-validated packets as well as any packets that prevented previously received packets from being validated up to a packet length of about 512bytes in carrier extension mode.

Once the undesired packets are flushed, the state machine will advantageously return to idle without receiving error tainted packets. As can be appreciated, this feature further exemplifies the flexibility and precise error checking performed by the SUPERMAC CORE 116 of FIG. 3 in accordance with one embodiment of the present invention.

Figure 13:
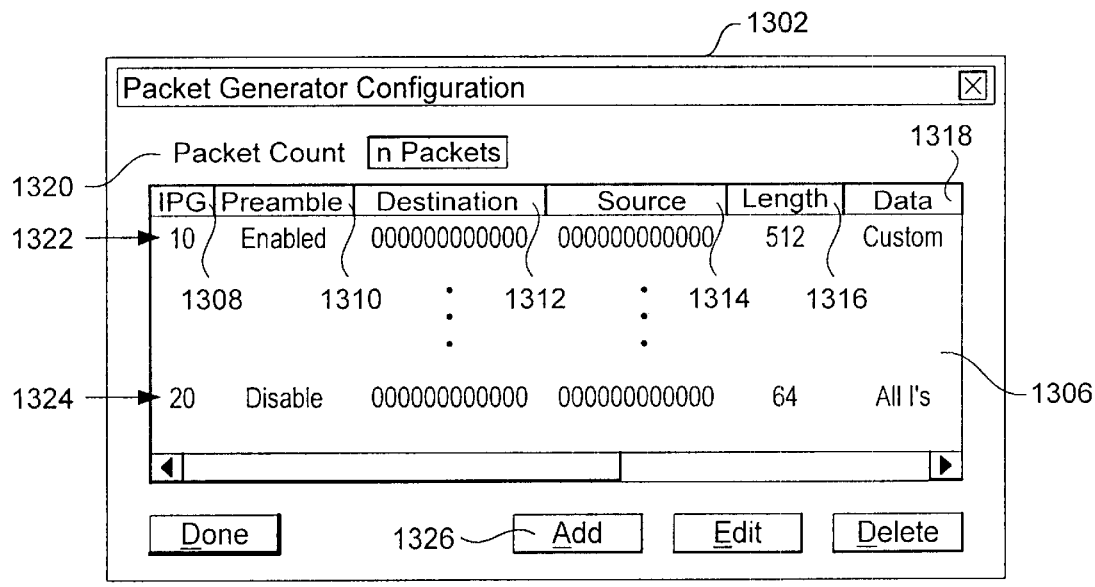
FIG. 13 is a packet generator configuration user interface for building packet data before transmission in accordance with one embodiment of the present invention.

FIG. 13 is a packet generator configuration 1302 user interface for building packet data before transmission in accordance with one embodiment of the present invention. In this embodiment, a packet count field 1320 is shown at a top left-hand corner of packet generator configuration 1302 to identify the number of packets (i.e., in packets) contained within a packet field 1306. As illustrated, packet field 1306 contains a number of exemplary packets, including a packet 1322 and a packet 1324. Of course, any number of packets may be contained within packet field 1306, and additional packets may be added by selecting ADD icon button 1326 in accordance with one embodiment.

As shown, each packet contained within packet field 1306 has various associated attributes that may be set in accordance with a user's preference. By way of example, suitable parameters may include, inter packet gap (IPG) 1308, preamble 1310, destination address 1312, source address 1314, length field 1316, and data field 1318.

For exemplary packet 1322, inter packet gap 1308 is set at a number "10." In this embodiment, the number 10 identifies the number of "16 bit" increments that define the actual number of bits associated with a particular inter packet gap. Accordingly, in this example, the IPG for exemplary packet 1322 is (10×16 bits=160 bits) 160 bits. Thus, a user may program any number in IPG field 1308, and that number may then be multiplied by 16 to arrive at the actual number of bits for the inter packet gap.

In this example, the preamble field 1310 is shown as enabled for packet 1322, however, it should be understood that the preamble may be disabled as described above by disabled by simply modifying a preamble selection field. Of course, the user interface screens are driving the appropriate software and underlying integrated circuit hardware that may be performing processing operations in accordance with this embodiment. In a like manner, a destination address 1312 and a source address 1314 are illustrated as arbitrary addresses that may be modified based on the user's requirements. As can be appreciated, the above described modularity allows users to custom design transmitted packets by simply selecting a packet and modifying its parameters on a packet-by-packet basis.

Also shown is length field 1316 that identifies the length of exemplary packet 1322 as 512bytes, although any suitable length may be selected by appropriately inputting the desired value. Finally, data field 1318 identifies the data for packet 1322 as custom. As is well known in the art, the data field may be in any suitable bit arrangement including all zeros, all ones, alternating ones and zeros, consecutive four ones followed by four zeros, consecutive five ones followed by five zeros, random bit allocation, and a custom user provided bit pattern. In this example, the data field 1318 contains user provided custom data.

Further shown is a second exemplary packet 1324 having an IPG of 20. As described above, an IPG of 20 means that 20 is multiplied by 16 to arrive at 320 bits for the programmable inter packet gap 1308. In this example, the preamble for exemplary packet 1324 is shown as disabled and suitable destination and source address digits may be appropriately input by the user. Further, the length of exemplary packet 1324 is shown as 64bytes and the data field 1318 is shown as being all ones (i.e., ALL 1's) as described above.

Figure 14:
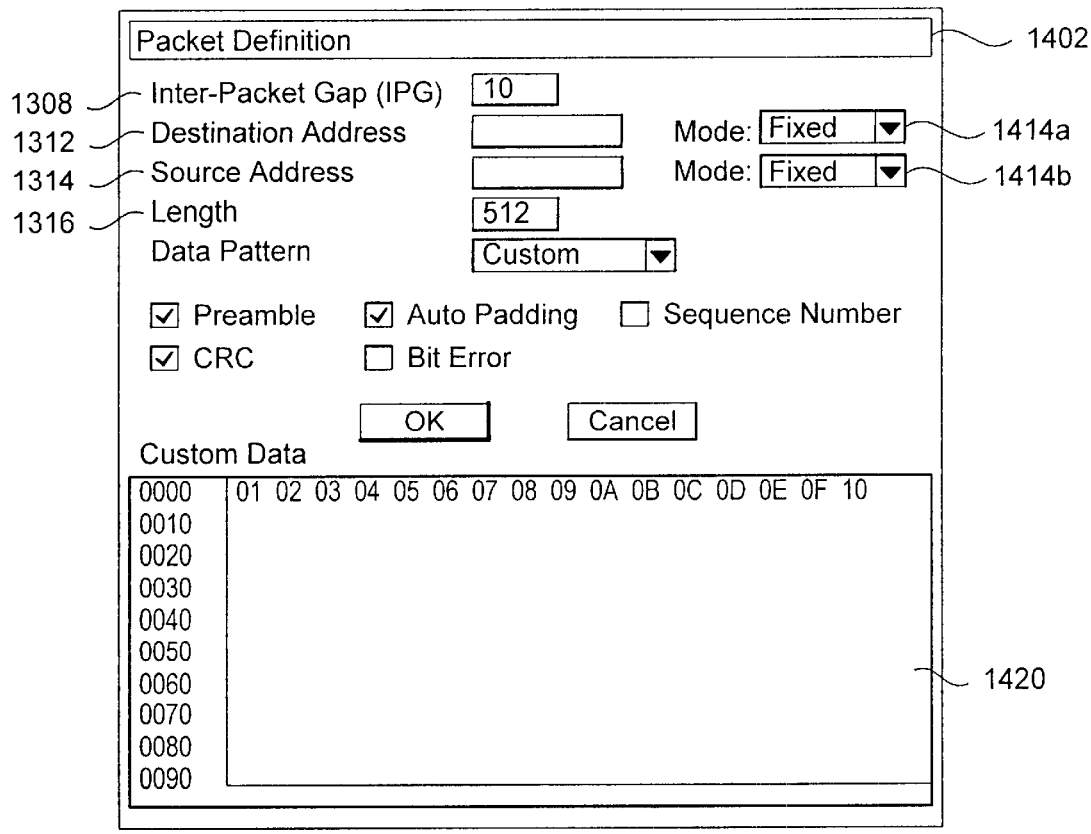
FIG. 14 shows an exemplary packet definition user interface for defining packet attributes in accordance with one embodiment of the present invention.

FIG. 14 shows an exemplary packet definition user interface 1402 in accordance with one embodiment of the present invention. Through this user interface, a user is able to precisely define the appropriate packet characteristics on a packet-by-packet basis. Accordingly, once a user selects a particular packet from packet field 1306 of FIG. 13, packet definition user interface 1402 of FIG. 14 may be displayed to the user to enable modifications. From this user interface, the user may appropriately set inter packet gap selection field 1308, destination address field 1312, source address field 1314, length field 1316, and data pattern field 1318.

In addition, the user may also select the appropriate modes 1414*a* and 1414*b* for the destination address 1312 and source address 1314, respectively. By way of example, by changing modes 1414*a* and 1414*b*, the user may automatically increment or decrement the appropriate input destination addresses or source addresses. In an alternative embodiment, the user may also select modes 1414*a* and 1414*b* to provide random destination or source addresses. Therefore, it should be appreciated that the user has a high degree of control and modularity for setting the appropriate characteristics of each packet being transmitted through flow based MAC 150 (of FIG. 2) in accordance with various user interfaces of the present invention.

Further shown, is selection boxes 1424 which allow user to select preamble, auto padding, CRC, bit error, and sequence numbers. As described above, if the user selects preamble, CRC, auto padding, bit error, and sequence number, these functions will be appropriately applied to the packet that is currently selected. In this embodiment, bit error allows a user to introduce a random number of error bits into a packet being transmitted in order to determine the response of a receiving station. Also, sequence number allows the user to add sequence numbers to each packet being transmitted which enables users to identify and determine whether certain packets having an associated sequence number were involved in a collision. Therefore, when packets containing sequence numbers are transmitted, it is possible to determine whether any of the transmitted packets were involved in a collision or has any errors associated therewith. This is a particularly advantageous feature when packets are of a short nature and are being transmitted near gigabit speed in accordance with one embodiment of the present invention.

In accordance with this embodiment, providing sequence number capabilities allows the user to transmit without having to provide a carrier extension to increase packet sizes. Finally, packet definition window 1402 shows a data field 1420 that is used to display the raw data contained within particular memory address locations 1422. Thus, as is well known in the art, for each memory address location 1422, there will be associated data that is being transmitted for the packet selected in FIG. 13.

Figure 15A:
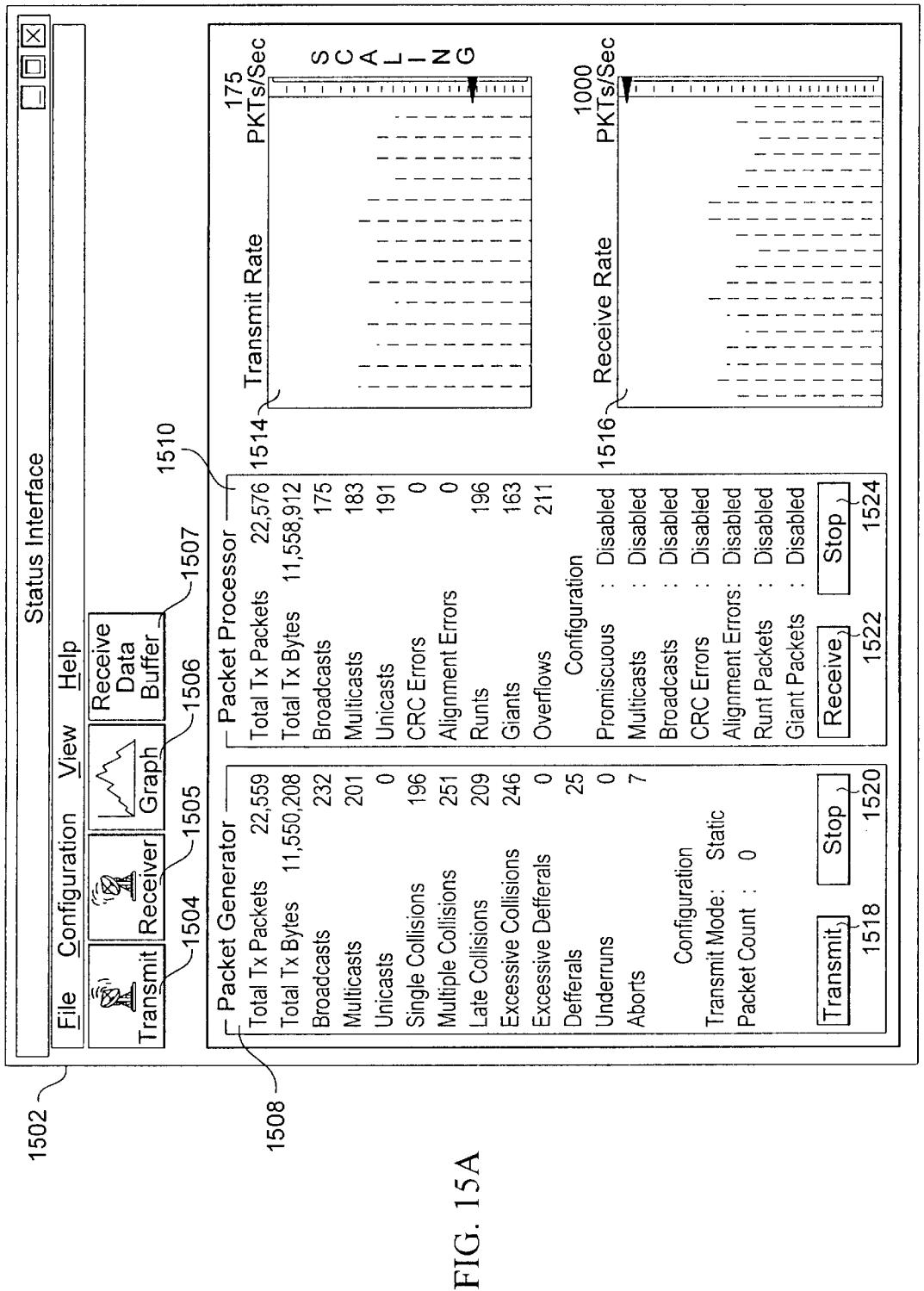
FIG. 15A is a status user interface window used for displaying transmit and receive status information in accordance with one embodiment of the present invention.

FIG. 15A is a user interface of a status interface window 1502 used for displaying transmit and receive status information in accordance with one embodiment of the present invention. Generally, status interface 1502 includes a packet generator status list 1508 that illustrates various characteristics of an in-progress transmit operation. By way of example, packet generator status list 1508 displays various parameters including: (a) a total transmitted packets field; (b) a total transmitted bytes field; (c) a broadcast field; (d) a multicast field; (e) a unicast field; (f) a single collisions field; (g) a multiple collisions field; (h) a late collisions field; (i) an excessive collisions field; (j) an excessive deferrals; (k) a deferrals field; (l) an under-runs field; and (m) an aborts field.

In this embodiment, the appropriate fields display information in "real-time" during an actual transmission of packet data. Accordingly, having this type of information allows users such as network managers to monitor the transmission characteristics of a particular network. In this embodiment, when a transmit icon 1504 or a transmit button 1508 are selected, transmission is appropriately placed in progress, and a "transmit rate" graph window 1514 may be displayed to pictorially identify packet data transmission characteristics.

Also shown is a packet processor status list 1510 that accounts for the processing parameters of packet data being received by a SUPERMAC Rx controller 120 of the flow based MAC 150 (of FIG. 2) in accordance with one embodiment of the present invention. By way of example, packet processor status list 1510 includes information such as: (a) total received packets, (b) total received bytes, (c) broadcasts, (d) multicasts, (e) unicasts, (f) CRC errors, (g) alignment errors, (h) runts (i.e., undersized packets), (i) giants (oversize packets), and (j) overflows. In addition, configuration information is also provided for both packet generator status list 1508 and packet processor status list 1510.

For packet generator status list 1508, configuration information is provided for both transmit mode and packet count. For packet processor status list 1510, configuration information is provided for promiscuous data, multicast data, broadcast data, CRC errors data, alignment errors data, runt packets data, and giant packets data. Accordingly, during a receiving operation, a receiver icon button 1505 or a receive button 1522 is preferably selected to initiate the receiving functions of packet processor status list 1510 which are numerically and graphically displayed in receive rate window 1516.

In this example, both transmit rate window 1514 and receive rate window 1516 display information regarding the rate of packets per second (i.e., pkts/sec) being either transmitted or received by the appropriate receiving and transmitting units. As shown, the transmit rate is 175 packets per second and the receive rate is 1,000 packets per second. However, it should be understood that the receiving and transmitting rates are merely exemplary and any suitable transmitting and receiving rate may be displayed within transmit rate window 1514 and receive rate 1516 window in accordance with the parameters of the associated network.

In addition, both transmit rate window 1514 and receive rate window 1516 are provided with a scaling graphical user interface bar for scaling the appropriate displayed information within each graphics window. Also, by selecting a graphics icon 1506, the user may appropriately scale the information being displayed within the graphics window or change the characteristics of the information being displayed. Of course, during the real-time transmission and receiving status generation, the user may appropriately stop transmissions by selecting a button 1520, or stop receiving functions by selecting a button 1524.

Figure 15B:
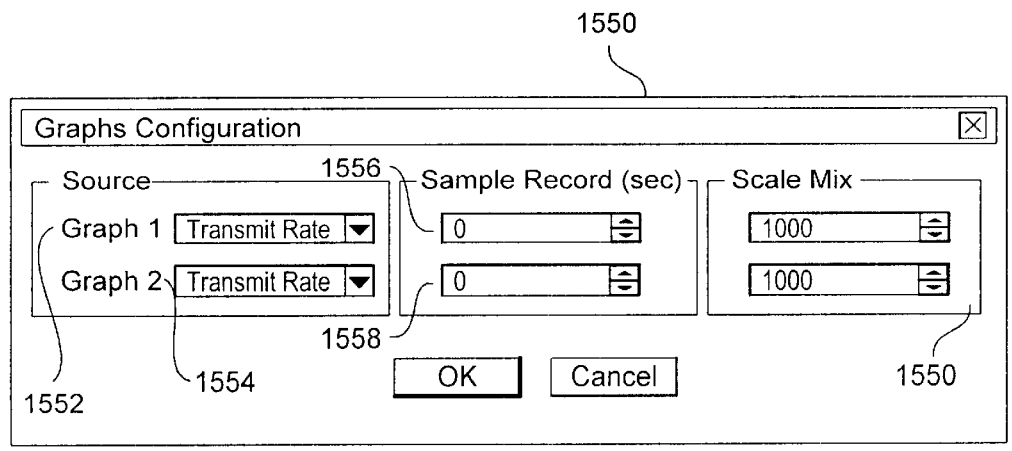
FIG. 15B shows a graphics configuration window for configuring graph attributes in accordance with one embodiment of the present invention.

FIG. 15B shows a graphics configuration window 1550 which is displayed to the user upon selecting graphs icon 1506 of FIG. 15A. By way of example, the user may select graphs 1 or 2 to graph any of the information that is numerically displayed within either packet generator status list 1508 or packets processor status list 1510. Accordingly, although only transmit and receive rates are being displayed for ease of illustration and description, it should be understood that any suitable information may be displayed within the graphics windows of FIG. 15A. Also shown is a "sample period" (in seconds) 1556 and 1558 for graphs 1 and 2 respectively, which may be used to select the appropriate sampling rate associated with each window of FIG. 15A.

Finally, a scale maximum/minimum may be used by select an appropriate scaling using icons 1550 of FIG. 15B.

Figure 16:
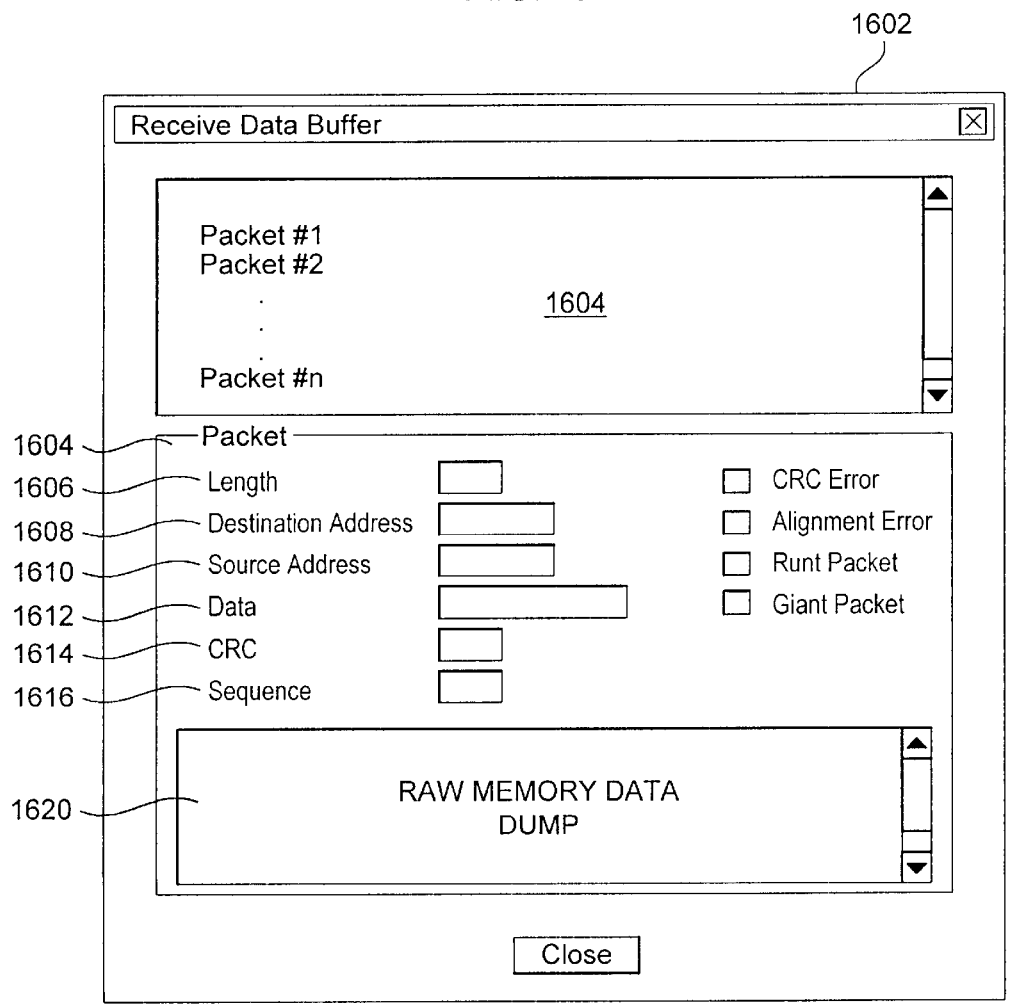
FIG. 16 is a receive data buffer window for displaying received packet data in accordance with one embodiment of the present invention.

FIG. 16 is a receive data buffer window 1602 which may be displayed to the user upon selecting receive data buffer icon 1507 in FIG. 15A. Within a display field 1604, a list of packets that are received by the receiver are displayed for the user's information. In this example, packet number 1, packet number 2, and up to packet number N are displayed within display field 1604. Once a particular packet is selected from display field 1604, a user may select a particular packet by implementing a suitable selecting device. Once a packet is selected, the selected packet's characteristics are displayed to the user in a packet characteristics field 1604.

Packets characteristic field 1604 identifies a variety of characteristic features of the received packet. By way of example, the received packets information regarding length 1606, destination address 1608, source address 1610, data address 1612, CRC 1614, and sequence 1616, are displayed for the user's information. Also provided is check boxes identifying whether the received packet has a CRC error, an alignment error, or is one of a runt packet and giant packet. Accordingly, once each packet is received, the user may simply select the that particular packet in packet field 1604, and all of its appropriate characteristics are displayed to the user for easy information. Also shown is a raw memory data dump field 1620 that is used to display the attributes of the packet data received from the receiving side of the flow based MAC 150 of FIG. 2. Of course, the received data will also include the associated memory address for ease of modification and reference.

Figure 17:
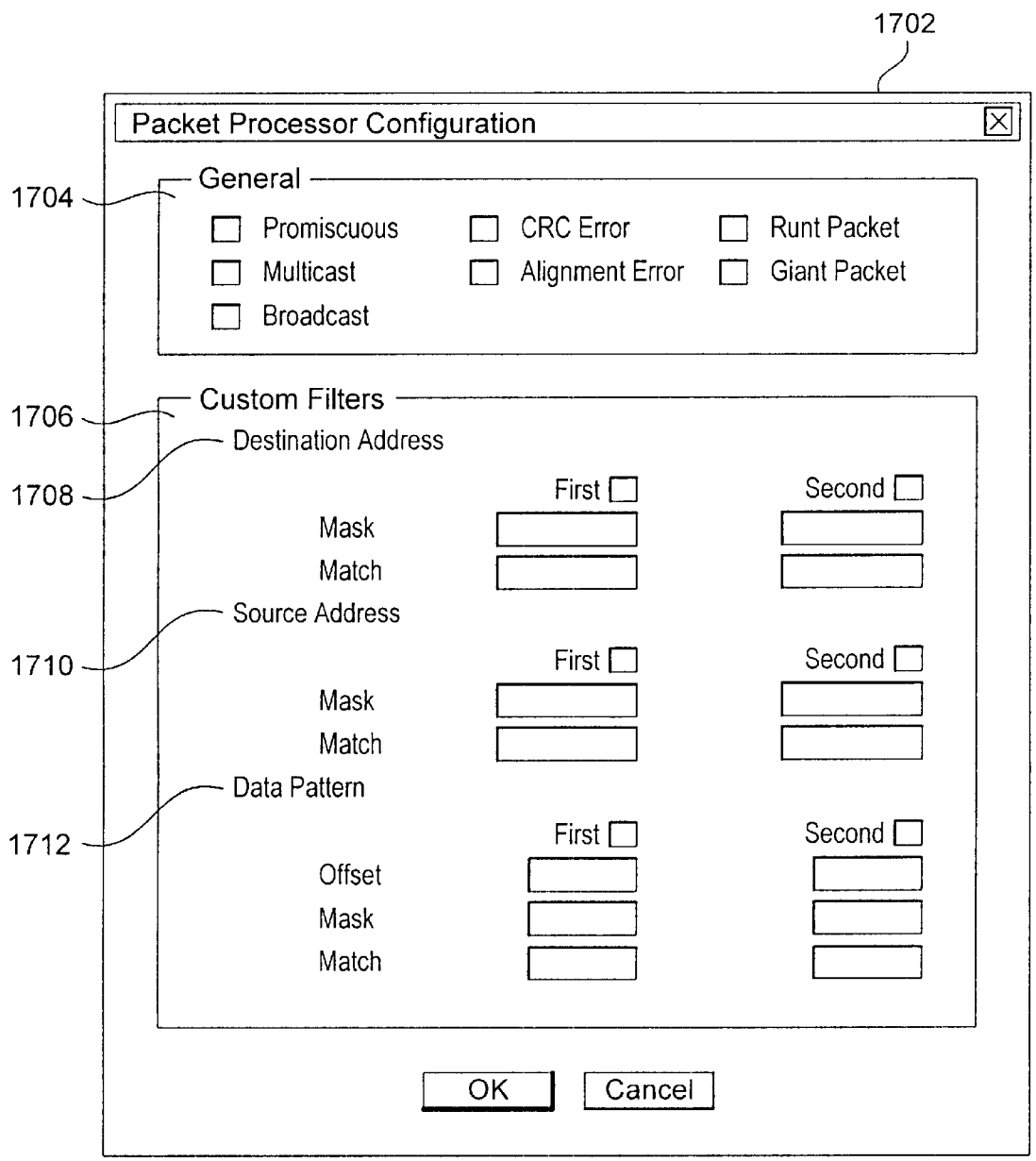
FIG. 17 is a packet processor configuration window used for performing management filtering functions on data received by a receiver in accordance with one embodiment of the present invention.

FIG. 17 is a packet processor configuration window 1702 used for performing management filtering functions on data received by a receiver in accordance with one embodiment of the present invention. By way of example, a general selection field 1704 is shown including: (a) promiscuous, (b) multicast, (c) broadcast, (d) CRC error, (e) alignment error, (f) runt packet, and (g) giant packet selection features. In this example, promiscuous selection check box is used to filter out and examine each and every part of a received packet (i.e., even if errors are present) when performing diagnostics analysis. Multicast selection check box is used when a user wants to configure the packet processor to receive and examine packets that has multicast destination address. Broadcast selection check box is used to configure the packet processor to examine packets that are broadcast to the network (i.e., destination address is a broadcast address). CRC error selection check box is used to configure the packet processor to examine (i.e., filter out and examine) packets with CRC errors.

Alignment error selection check box is used to enable the receiving of packets containing alignment errors. As is well known, for 10 Mbps systems, alignment error is usually described as dribble error, for one 100 Mbps systems, alignment error is described as nibble error (4 bit), and for 1000 Mbps systems (i.e., gigabit), alignment error is described as byte errors. Finally, runt packets selection check box is used to enable the viewing of packets being smaller than 64 bytes, and giant packets selection check box is used to enable viewing of packets being longer than 1518 bytes. Of course, in accordance with one embodiment of the present invention, a user may modify the standard defined packet minimums and packet maximums by appropriately setting the suitable registers within the SUPERMAC core 116 of FIG. 3. Alternatively, these settings may be performed through a suitable software user interface.

Custom filters section 1706 provides the user with the flexibility of filtering specific portions of a destination address 1708, a source address 1710, and a data pattern 1712. By way of example, by appropriately selecting a portion of the destination address (e.g., masking that portion of the selected destination address), and by inputting an appropriate match bit pattern, the user may filter out the appropriate information for performing management and diagnostics operations. Accordingly, the user may also mask and match more than one portion of a destination address. As shown, the user may mask and match two portions of a destination and source address.

However, it should be understood that the user interface may be extended to allow more defined masking and matching operations in accordance with a user's needs. For a data pattern 1712, the user may also select an appropriate offset from a suitable packet beginning point (i.e., usually a 16 bit offset) by inputting the appropriate information in the corresponding fields. Once an appropriate offset is selected, the user may again identify a mask and a match for the data pattern being filtered.

As used herein, reference to the IEEE 802.3 standard shall be understood to include all current IEEE 802.3 standards, including: (a) IEEE 802.3u standard (100 Mbps-Fast Ethernet) IEEE std 802.3u-1995; (b) IEEE 802.3z standard (1000 Mbps-Gigabit Ethernet); and (c) ISO/IEC 8802-3, ANSI/IEEE Std 802.3 (fifth edition 1996). All above identified standards are hereby incorporated by references.

The present invention may be implemented using any type of integrated circuit logic or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout. Although any suitable design tool may be used, another layout tool may include a hardware description language "Verilog®" tool available from Cadence Design Systems, Inc. of Santa Clara, Calif.

The invention may also employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 18:
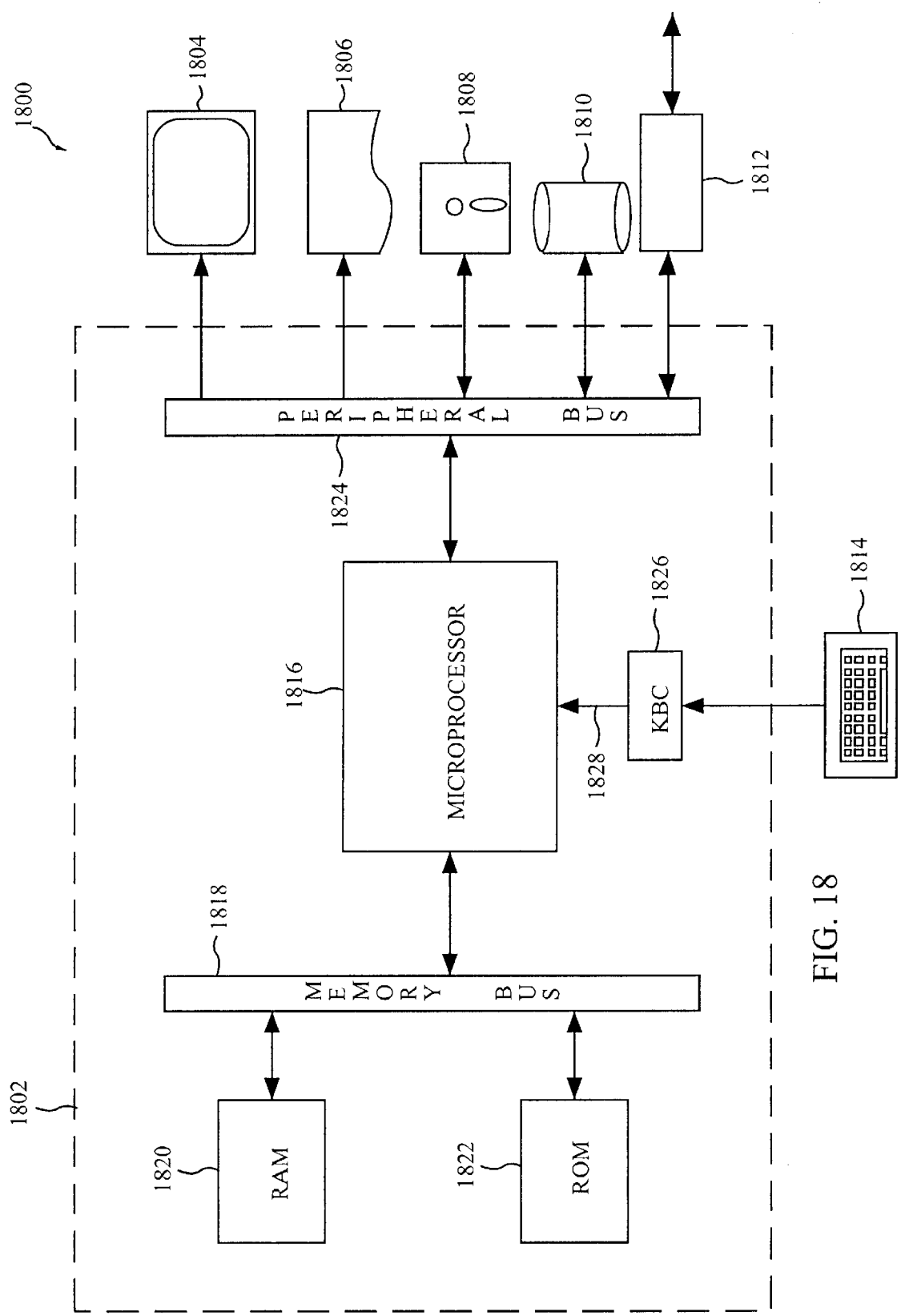
FIG. 18 is a block diagram of an exemplary computer system for carrying out the processing according to the invention.

FIG. 18 is a block diagram of an exemplary computer system 1800 for carrying out the processing according to the invention. The computer system 1800 includes a digital computer 1802, a display screen (or monitor) 1804, a printer 1806, a floppy disk drive 1808, a hard disk drive 1810, a network interface 1812, and a keyboard 1814. The digital computer 1802 includes a microprocessor 1816, a memory bus 1818, random access memory (RAM) 1820, read only memory (ROM) 1822, a peripheral bus 1824, and a keyboard controller 1826. The digital computer 1800 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1816 is a general purpose digital processor which controls the operation of the computer system 1800. The microprocessor 1816 can be a single-chip processor or can be implemented with multiple components. Using instructions retrieved from memory, the microprocessor 1816 controls the reception and manipulation of input data and the output and display of data on output devices. According to the invention, a particular function of microprocessor 1816 is to assist in the packet processing and network management tasks.

The memory bus 1818 is used by the microprocessor 1816 to access the RAM 1820 and the ROM 1822. The RAM 1820 is used by the microprocessor 1816 as a general storage area and as scratch-pad memory, and can also be used to store input data and processed data. The ROM 1822 can be used to store instructions or program code followed by the microprocessor 1816 as well as other data.

The peripheral bus 1824 is used to access the input, output, and storage devices used by the digital computer 1802. In the described embodiment, these devices include the display screen 1804, the printer device 1806, the floppy disk drive 1808, the hard disk drive 1810, and the network interface 1812. The keyboard controller 1826 is used to receive input from keyboard 1814 and send decoded symbols for each pressed key to microprocessor 1816 over bus 1828.

The display screen 1804 is an output device that displays images of data provided by the microprocessor 1816 via the peripheral bus 1824 or provided by other components in the computer system 1800. The printer device 1806 when operating as a printer provides an image on a sheet of paper or a similar surface. Other output devices such as a plotter, typesetter, etc. can be used in place of, or in addition to, the printer device 1806.

The floppy disk drive 1808 and the hard disk drive 1810 can be used to store various types of data. The floppy disk drive 1808 facilitates transporting such data to other computer systems, and hard disk drive 1810 permits fast access to large amounts of stored data.

The microprocessor 1816 together with an operating system operate to execute computer code and produce and use data. The computer code and data may reside on the RAM 1820, the ROM 1822, or the hard disk drive 1820. The computer code and data could also reside on a removable program medium and loaded or installed onto the computer system 1800 when needed. Removable program mediums include, for example, CD-ROM, PC-CARD, floppy disk and magnetic tape.

The network interface 1812 is used to send and receive data over a network connected to other computer systems. An interface card or similar device and appropriate software implemented by the microprocessor 1816 can be used to connect the computer system 1800 to an existing network and transfer data according to standard protocols.

The keyboard 1814 is used by a user to input commands and other instructions to the computer system 1800. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. It should be understood that the various processing functions described above may be implemented both in silicon as hardware integrated circuits, or as software code that may be stored and retrieved from any suitable storage medium. By way of example, such storage mediums may include a disk drive, a hard drive, a floppy disk, a server computer, a remotely networked computer, etc.

In addition, it should be understood that the above described features and functionalities are fully downward compatible to 10 Mbps Ethernet systems and 100 Mbps fast Ethernet systems and associated Asynchronous Transfer Mode (ATM) systems. Of course above described embodiments also apply to switched, and non-switched, and full/half duplex network systems. Accordingly, the present embodiments are to be considered as illustrative and not restrictive, and the invention is not to be limited to the details given herein, but may be modified within the scope and equivalents of the appended claims.

What is claimed is:

1. A data controller, comprising:
   a transmit controller configured to process out-going packet data that is received from an upper layer for transmission to a lower layer, at least part of the processing being alterable by control information received while the out-going packet data is being processed;
   a receive controller configured to process in-coming packet data that is received from the lower layer for transmission to the upper layer, at least part of the processing being alterable by control information received while the in-coming packet data is being processed;
   a transmit multi-packet queue device for receiving the out-going packet data from the upper layer before being passed to the transmit controller; and
   a receive multi-packet queue device for receiving the in-coming packet data that is received by the receive controller.

2. A data controller as recited in claim 1, further comprising a parallel event processor for processing management information and control information in parallel with the processing of packet data through the transmit controller and the receive controller.

3. A data controller as recited in claim 2, wherein the parallel event processor includes a packet buffer for storing simple network management protocol information, and remote monitoring information that is used to characterize network traffic statistics.

4. A data controller as recited in claim 2, wherein the parallel event processor includes programmable counters for storing information related to new network processing events and statistics.

5. A data controller as recited in claim 2, further comprising a first internal stream processor for processing packet data being transferred between the transmit multi-queue device and the transmit controller, the first internal stream processor also being configured to process packet data being transferred between the receive controller and the receive multi-queue device.

6. A data controller as recited in claim 5, wherein said parallel event processor further comprises a second internal micro-RISC stream processor configured to selectively filter packet data being processed through the first internal micro-RISC stream processor, wherein the selective filtering provides packet data for processing management requests.

7. A data controller as recited in claim 6, wherein the second internal micro-RISC stream processor is configured to receive selected packet data from the transmit controller and the receive controller for processing management requests.

8. A data controller as recited in claim 7, wherein the second internal micro-RISC stream processor stores the selected packet data in statistical counters contained within the parallel event processor.

9. A media access controller as recited in claim 7, further including a network data bus interface controller for communicating packet data information between the transmit and receive multi-packet queue devices and a network data system bus.

10. A media access controller as recited in claim 9, further including a streaming control bus interface controller for communicating between the parallel event processor and a management/control bus that is separate from a network data system bus.

11. A network interface system comprising:

a data controller for processing transmit data received an upper layer and transmitting the processed transmit data to a lower layer, processing receive data received from the lower layer and transmitting the processed receive data to the upper layer, the data controller being configured to monitor the flow of data between the upper and lower layers;

a data bus for communicating data between the upper layer and the data controller; and a management control bus for communicating management control information between the upper layer and the media access controller, the management control bus communicating independently of the data bus.

12. A transmit data controller, comprising:

a transmit interface unit configured to receive packet data, transfer control signals and control information from an upper layer, wherein the transmit interface unit is operable to substantially simultaneously receive the control information and the packet data;

a transmit controller for processing the packet data based on the control information received from the upper layer, the transmit controller being bi-directionally coupled to the transmit interface unit, wherein while the packet data is being processed, the transmit controller is operable to receive new control information from the transmit interface unit thereby altering at least part of the processing; and an interface unit configured to receive packet data from the transmit controller before being transmitted to a physical layer.

13. A transmit media access controller as recited in claim 12, wherein the interface unit is configured to communicate with a fiber channel physical layer.

14. A transmit media access controller as recited in claim 13, wherein the interface unit communicates with the fiber channel physical layer through a fiber channel encoder.

15. A transmit media access controller as recited in claim 12, wherein the interface unit includes a gigabit media independent interface configured to communicate with an ethernet physical layer.

* * * * *